April 16, 1957   O. L. PATTERSON   2,788,938
ANALOG COMPUTER OR ANALYZER
Filed Nov. 18, 1950   12 Sheets-Sheet 1

INVENTOR.
OMAR L. PATTERSON
BY
ATTORNEYS

INVENTOR.
OMAR L. PATTERSON

INVENTOR.
OMAR L. PATTERSON

INVENTOR.
OMAR L. PATTERSON

INVENTOR.
OMAR L. PATTERSON

INVENTOR.
OMAR L. PATTERSON

April 16, 1957     O. L. PATTERSON     2,788,938
ANALOG COMPUTER OR ANALYZER
Filed Nov. 18, 1950     12 Sheets-Sheet 7

INVENTOR.
OMAR L. PATTERSON
BY
ATTORNEYS.

April 16, 1957  O. L. PATTERSON  2,788,938
ANALOG COMPUTER OR ANALYZER
Filed Nov. 18, 1950  12 Sheets-Sheet 10

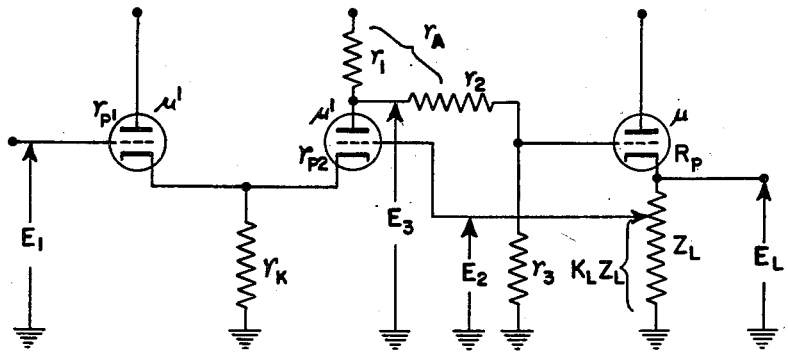

(1) $E_3 = G(E_1 - E_2) - H \dfrac{(E_1 + E_2)}{2}$.

(2) $G = \dfrac{\mu'}{1 + \dfrac{r_{P1} + r_{P2}}{r_A}}$.

(3) $H = \left(\dfrac{\mu'}{\mu'+1}\right) \cdot \dfrac{r_{P1}}{r_K} \cdot \dfrac{1}{1 + \dfrac{r_{P1}+r_{P2}}{r_A}}$.

(4) $E_L = E_1 \left(\dfrac{\mu}{\mu+1}\right)\left(\dfrac{G - \frac{H}{2}}{G + \frac{H}{2}}\right) \cdot \dfrac{K_G}{\left(\frac{\mu}{\mu+1}\right) K_G K_L + \dfrac{1}{\left(G+\frac{H}{2}\right)}} \cdot \dfrac{Z_L}{Z_L + \dfrac{R_P}{(\mu+1)\left(G+\frac{H}{2}\right)\left(\left(\frac{\mu}{\mu+1}\right) K_G K_L + \dfrac{1}{\left(G+\frac{H}{2}\right)}\right)}}$.

(5) $K_G = \dfrac{r_3}{r_2 + r_3}$.

(6) $R_{eff} = \varepsilon \dfrac{K_d}{(1+K_d)^2} \cdot R_P$.

(7) $C_{eff} = C(1 + K_d)$.

FIG. 8.

INVENTOR.
OMAR L. PATTERSON
BY
ATTORNEYS

United States Patent Office 2,788,938
Patented Apr. 16, 1957

2,788,938

ANALOG COMPUTER OR ANALYZER

Omar L. Patterson, Media, Pa., assignor to Sun Oil Company, Philadelphia, Pa., a corporation of New Jersey Application November 18, 1950, Serial No. 196,480

29 Claims. (Cl. 235—61)

This invention relates to analog computers or analyzers and more particularly to apparatus designed for the solution of problems relating to oil reservoirs. The invention is of more general application as will be hereinafter pointed out.

As specifically disclosed, the invention relates to an analog of an oil reservoir provided for the purpose of predicting conditions which may arise in the future in an oil reservoir when past conditions of operation are known. In brief, there is provided a device which has components of adjustable type and which is theoretically an analog of an oil reservoir. By adjustments and taking into account past history of a reservoir to be analyzed, the analog is made to correspond quantitatively to such reservoir. Thereafter, various proposed controls of operation may be applied to the analog to secure results therefrom indicative of the expected operation of the reservoir.

In my application Serial No. 130,270, filed November 30, 1949, now Patent No. 2,727,682, there is disclosed in detail an oil reservoir analyzer typical of an extensive class of computers. This analyzer, involving low time constants, is repeatedly cycled at a high frequency rate, for example 250 times per second. Provision is made for the precise marking of an instant of time repeatedly during the repetition cycles by pulses which are used to gate values of a variable, such as a potential, at that particular instant, so that, in a sense, a "stroboscopic" view of a recurrent phenomenon may be secured, picked off at a repeated phase instant of the time cycle. The same type of provision is made in accordance with the present invention so that a measurement of a variable at a particular instant in each of a series of repeated cycles is made to a high degree of accuracy, the result thus being, in effect, what could theoretically be secured by making measurements of abscissae and ordinates on an oscilloscope screen if the oscilloscope was of a type permitting a very high degree of accuracy of measurement beyond that attainable in any now known.

As will become clear hereafter, it is desired to program the variations of certain variables in an arbitrary fashion during each repetition cycle of operation. Provision is made in accordance with the present invention to accomplish this with the result that the operator can establish a precise functional variation with time of one or more variables in the system. In accordance with the invention the complete cycle is broken up into two parts, one of which prepares the apparatus for its analog operation and the other of which involves the transient phase of operation which is of interest.

In the apparatus of said prior application there is taken into account the fact that an electrical analog to an oil reservoir may be provided by a system in which resistance is the analog of a function of permeability and viscosity, capacity is the analog of a function of fluid compressibility and porosity, current is the analog of flow rate of fluid, and potential is the analog of pressure. The model of said application comprises two major parts and controlling devices therefor. One of these parts is a scaled oil zone of the reservoir which takes the form of a device having distributed resistance and capacitance and geometrically similar, from the standpoint of horizontal dimensions, to the actual oil zone. This model is bounded by one or more equipotential surfaces and is provided with analogs of wells, the currents withdrawals through which are controlled in accordance with a predetermined program.

The second major part of the apparatus comprises a network which simulates water drive conditions and which provides input to the equipotential boundary or boundaries of the oil zone model. While this network could have distributed parameters it may be readily demonstrated that refinements in this direction are unnecessary, and that, to a quite sufficient degree of accuracy, lumped parameters may constitute the network.

In short, the analog in said application is of a type involving both time and space correspondence to an actual reservoir.

It has been found that the time and space analog just mentioned is capable of giving, in one sense, more minutely detailed results than are either usually required, or usually justified by the data available to be put into the analog to control its operation. This may be explained as follows:

Generally in an oil reservoir the producing wells are located in a zone which is quite small relative to the dimensions of the entire reservoir consisting of the region in which flow is occurring to drive liquid to the wells. From the standpoint of the large dimensions of the reservoir, production through the total of a large number of wells may be usually regarded as taking place through a single large well located at one point; or perhaps more accurately, there may be considered to exist a boundary about a limited zone surrounding the group of wells, outside of which boundary the effects of production through individual wells cannot be distinguished from the effects of other wells or from the effects of all of the wells. In other words, the complete history of the region external to the boundary may be considered for all practical purposes to depend on, or give rise to, an average flow across the boundary and pressure at all points of the boundary if the boundary is chosen as an equi-pressure surface surrounding the wells. (In the electrical analog this equipressure surface is an equipotential surface and will be so referred to hereafter.)

What is then of interest from the standpoint of the region outside the boundary is the time-history of conditions existing at this boundary, without regard to the individual histories of the wells within the boundary. The invention to which the present application relates is the time analog involved in determination of time variations of conditions existing at this boundary.

The producing zone within the boundary referred to is of limited spatial extent and the history of what occurs within the boundary, and in particular at the individual wells, may be considered to depend on conditions arising at the boundary. Because the zone is of limited spatial extent, furthermore, it is permissible to consider that the conditions existing at a particular well at a particular time are dependent solely upon conditions existing at the boundary at the same particular time, as contrasted with times substantially preceding that time. The term "particular time" is here used in the sense of a period of short duration compared with the long periods involved in conditions outside the boundary. In short, what occurs within the boundary may be adequately represented by a space analog considered as to conditions existing at a particular time, and may be determined by setting up a steady state condition of the analog. During a particular time, a steady current (liquid) flow into the zone across the boundary may be maintained with a particular potential (pressure) maintained at the boundary and flows may be set up through the individual wells and pressures measured in the space analog. Then this may be repeated for other times, using the data for the boundary obtained from the time analog, thus giving a complete detailed history. As will be evident this assumes absence of transients within the production zone but this assumption is well justified in practice since short time transients are rapidly attenuated with distance from wells at which they originate.

It will be obvious that this breaking up of the analyzer into separate time and space analogs is conducive to very considerable simplification of the analyzer in that, in particular, individual production-time programs of the wells do not enter into the programming of the time analog; instead only a single program of flow across the boundary is required, this being taken as the summation of the individual production programs of the wells.

In accordance with the present invention, there is incorporated in the time analog a gas cap analog to take into account the effect of a gas cap overlying the liquid undergoing production. Proper control of a gas cap is often of great importance, gas therefrom being produced sometimes at a regulated rate while at other times gas may be pumped into the gas cap to maintain pressures. The gas cap analog of the present invention not only conforms to the proper gas law but is subject to programming to simulate actual conditions, thereby to give rise to a more realistic analysis of the history of the reservoir. The foregoing matters and the objects of the invention relating thereto, will become clearer from detailed consideration of the construction and operation of the analog which follows.

While the invention primarily concerns a reservoir analyzer as outlined above it will become evident that it is of more general applicability to analog computers or analyzers, and that broader objects are accordingly involved.

Furthermore, as will appear hereafter, other objects of the invention relate to the provision of various parts of the apparatus which, though highly advantageous in combination with each other, may, as will be evident to those skilled in the art, be used separately as, for example, in the case of the provision of dynamic continuously adjustable capacitances, gating systems, accurate measuring devices, low impedance follower circuits, etc.

All of the objects indicated above and further objects of the invention, relating particularly to details of construction and operation, will become apparent from the following description read in conjunction with the accompanying drawings:

Figure 1 is a block diagram illustrating parts of a reservoir analyzer provided in accordance with the invention and showing diagrammatically their interrelationships;

Figures 2A and 2B constitute a wiring diagram of the gas cap analog portion of the analyzer;

Figure 3 is a wiring diagram of the water drive network of the analyzer;

Figures 4A and 4B constitute a wiring diagram of the time control unit of the analyzer and a gated meter thereof;

Figure 3:
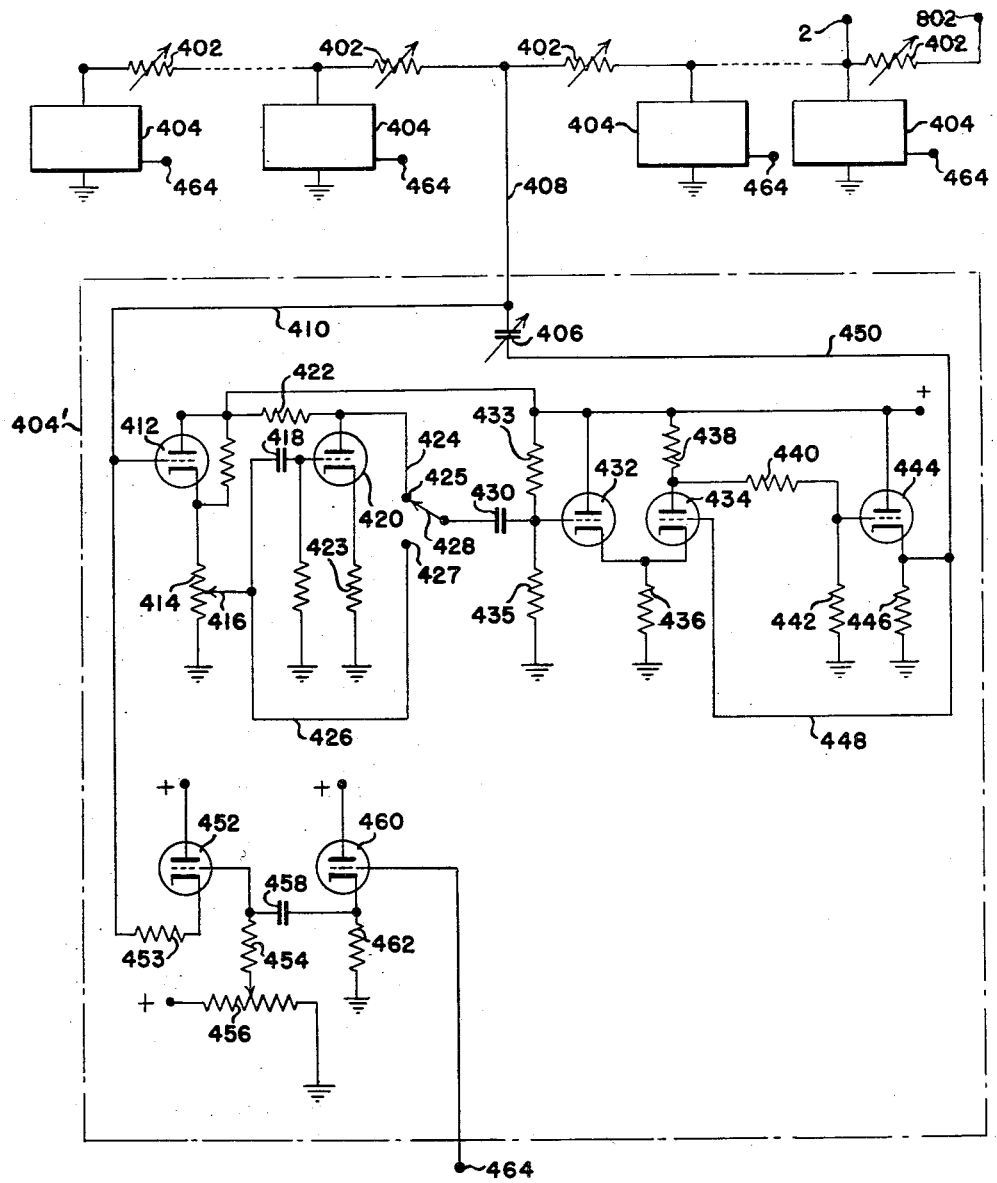
Figure 9:
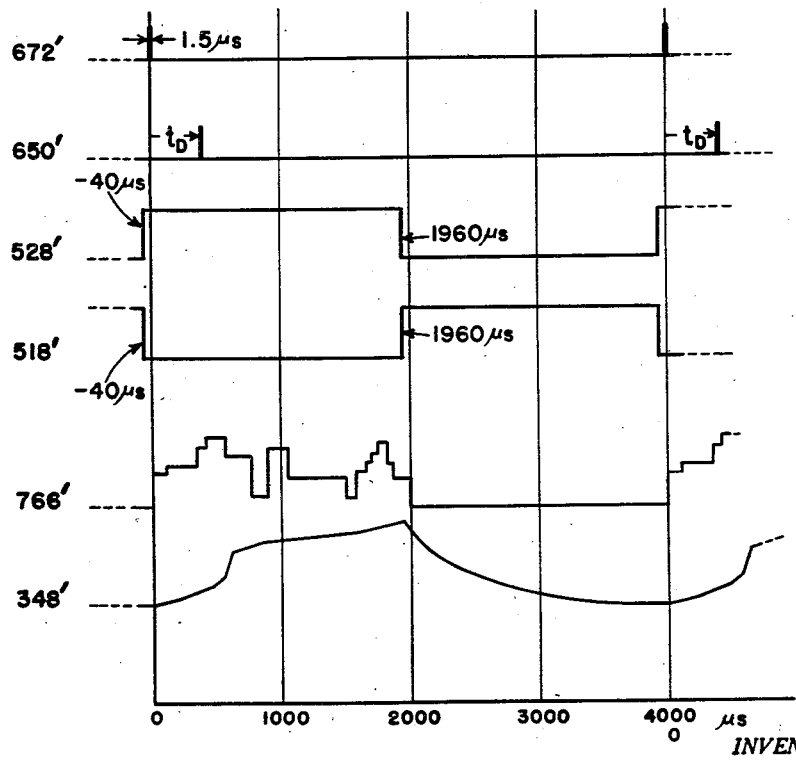
Figure 10:
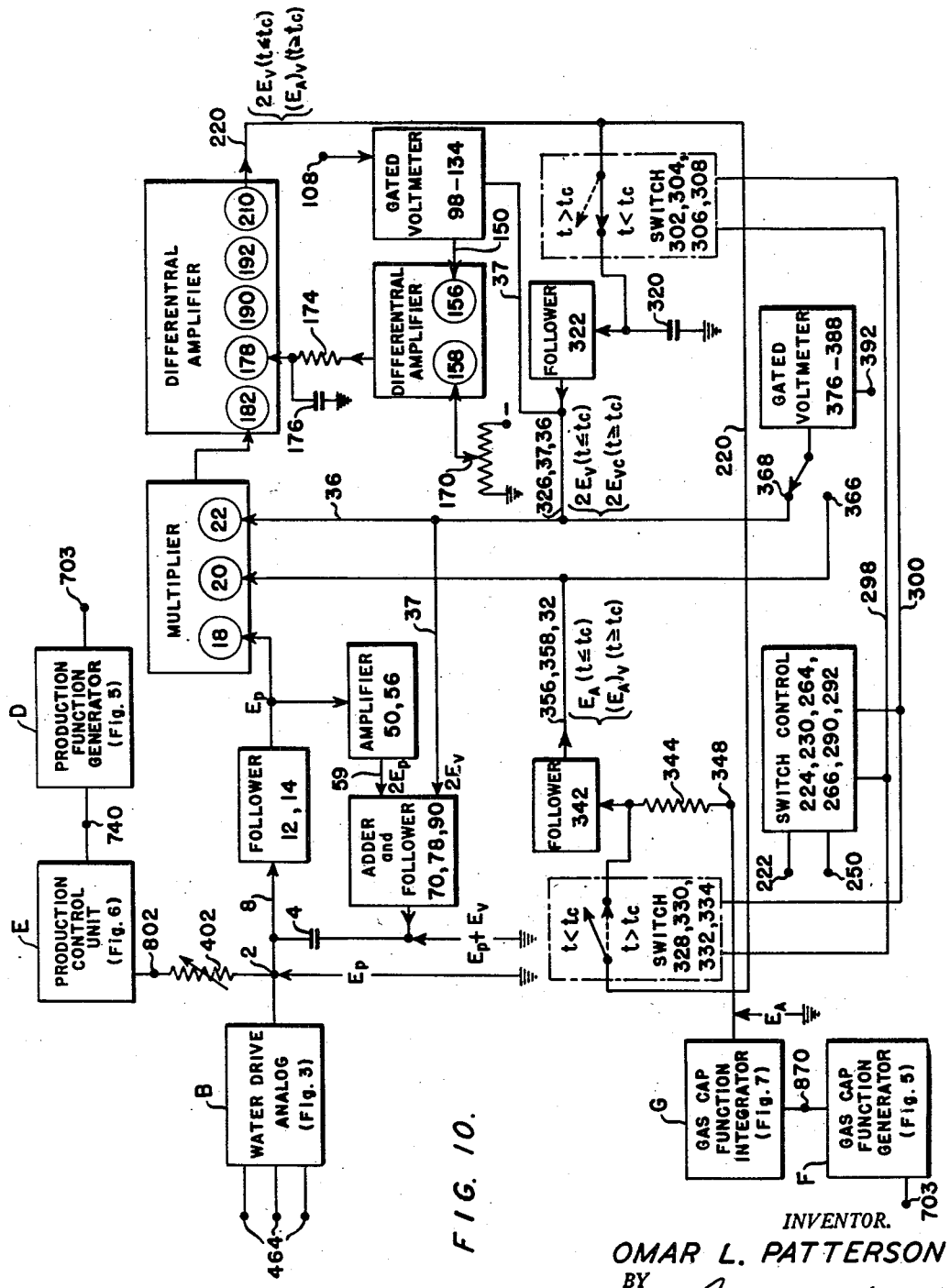
Figure 11:
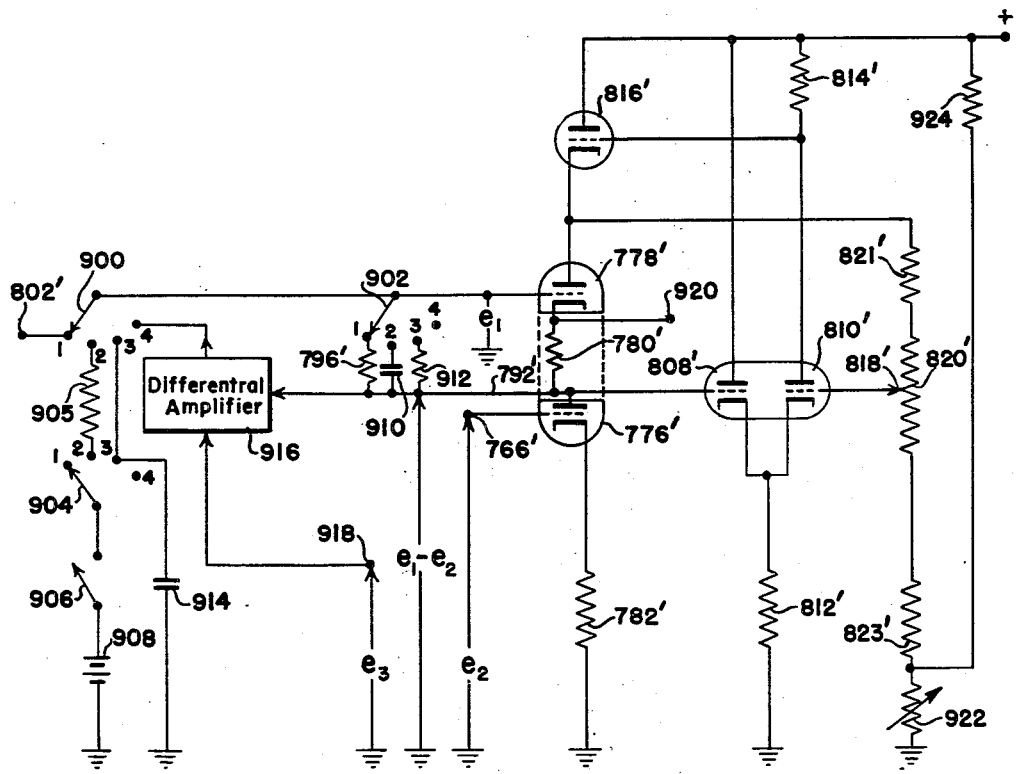

Figure 8 in its upper portion shows a diagram illustrating the improved cathode follower of the type incorporated in the water drive analog of Figure 3 and in its lower portion there are given certain formulae descriptive of this follower and of the dynamic capacitance in which it is incorporated in Figure 3;

Figure 9 is a diagram illustrating in particular the variations of certain quantities herein involved with respect to time;

Figure 10 is a block diagram indicating the various elements of the reservoir analyzer and in particular serving to illustrate the operation of the gas cap analog; and Figure 11 is a wiring diagram of a unit which may, by selective switching, be used for effecting various calculating or control functions.

Figure 1:
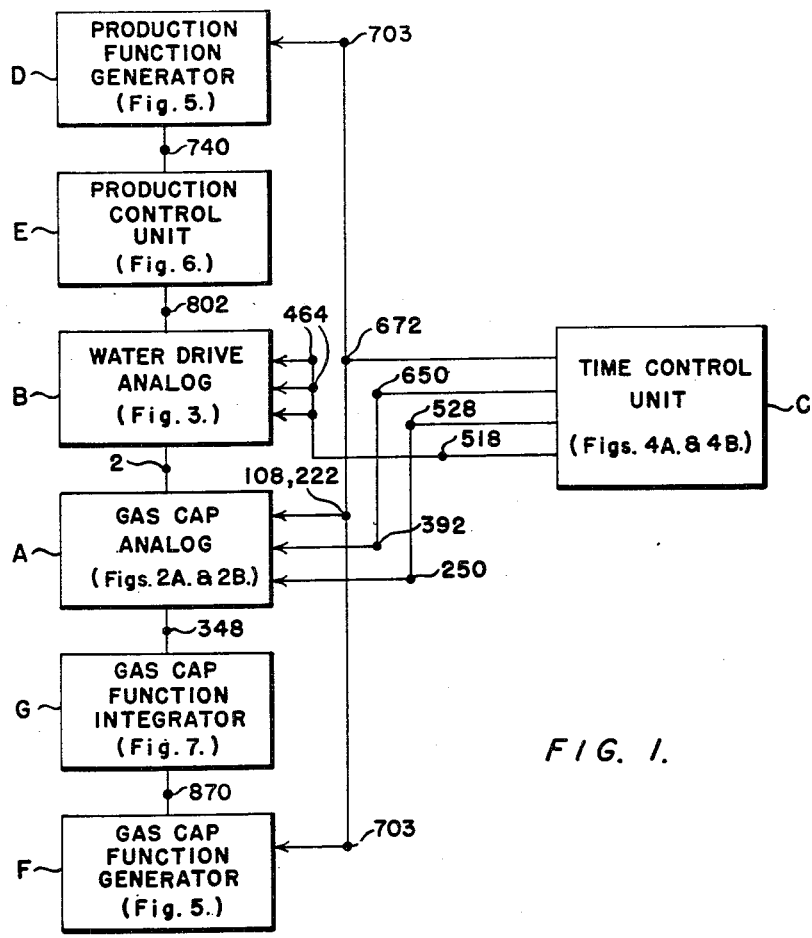

Referring first to the block diagram constituting Figure 1, there are shown therein the various units which form the analyzer. The interconnections of these units are indicated by the terminals which are referred to hereafter in the detailed consideration of the units. There are also indicated on the units the figures of the drawings which show details of their wiring.

The water drive analog indicated at B provides pressure and current at a point which is representative of the boundary of the producing zone referred to in the introduction to the specification. This water drive network starts operation at approximately the beginning of what may be called the active portion of the repetitive cycle of the operation. Connected to its output are the gas cap analog A and the production control unit E. The former provides flow of current representing displacement of liquid due to the gas cap. The production control unit E provides for the withdrawal of current corresponding to the flow of liquid through the wells in the production zone. The production is controlled according to a program set up in the production function generator D which controls the production control unit E. In similar fashion there is provided a gas cap function generator F, the output of which is integrated in the gas cap function integrator G to provide a programming of gas withdrawal from or addition to the gas cap. The various units so far mentioned are controlled as to time by the time control unit C. The overall operation of the analyzer may be best made clear by considering first the constructions and characteristics of the various units which are shown in the wiring diagrams on the drawings. It may be remarked that the gas cap function generator is similar in construction to the production function generator and consequently Figure 5 applies to both, though it will be primarily described as illustrating the more elaborate production function generator.

Figure 2A:
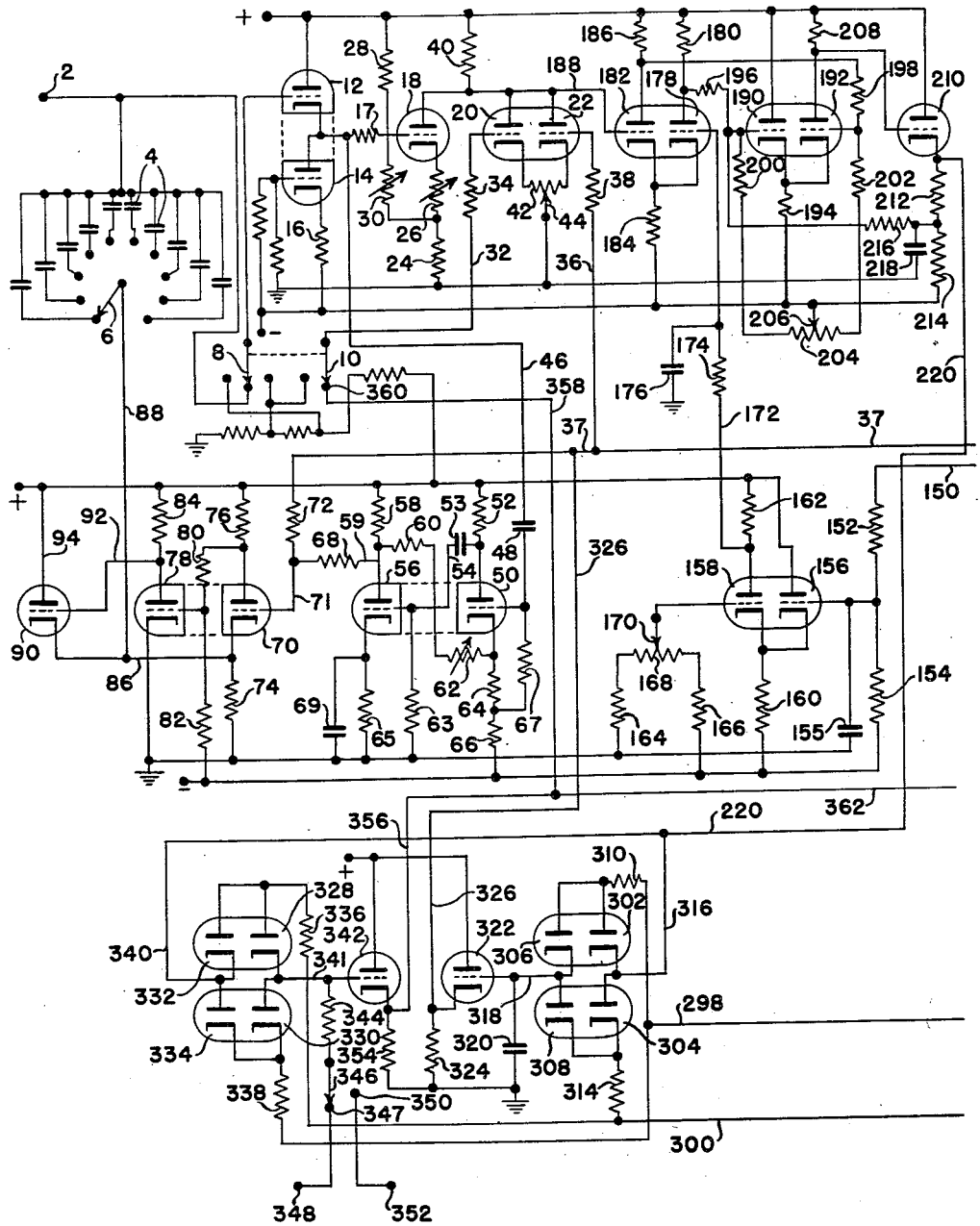
Figure 2B:
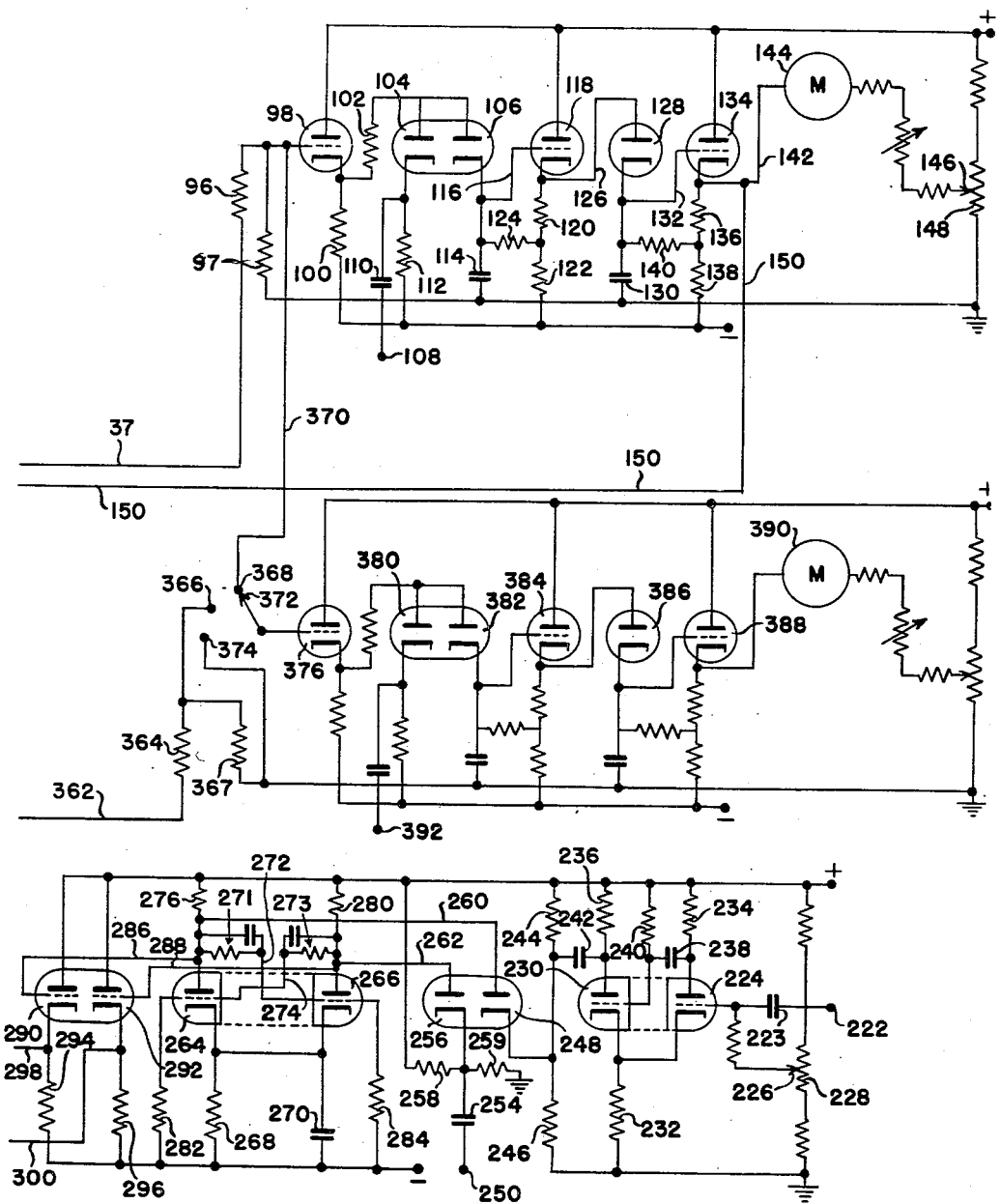

The gas cap analog of the analyzer is illustrated in Figures 2A and 2B and will be first described. It has an input terminal indicated at 2 between which and ground there are connected the output terminals from the water drive analog. The terminal 2 is connected to the upper terminals of a group of condensers 4, the lower terminals of which may be selectively contacted by means of a switch 6. The terminal 2 is also connected to a contact shown as engaged by a switch 8 which is ganged with a second switch 10, both of these having several positions which, except for the positions indicated, are merely for calibration. (It may be here remarked that various other calibrating connections are herein shown but, in general, these will not be described, it being understood that various parts of the circuits are calibrated and measured in conformity with standard practices.) The switch 8 is connected to the grid of a triode 12 arranged in conjunction with a second triode 14 and resistance 16 to form a "constant current" cathode follower arrangement. Such an arrangement is known and is described, for example, in Vacuum Tube Amplifiers, vol. 18, Radiation Laboratory Series, p. 432. The arrangement has the advantage of highly linear response but of presenting a low output impedance. For present purposes it need only be remarked that the cathode of triode 12 always assumes a potential close to that appearing at the terminal 2, i. e., at the grid of triode 12, and quite accurately linearly related thereto.

The output from this follower is fed to the grid of the first triode of a multiplication circuit which includes the triodes 18, 20 and 22. A series arrangement of a fixed resistance 24 and a variable resistance 26 connects the cathode of triode 18 to ground. The junction of resistances 24 and 26 is connected to the positive high voltage supply through a fixed resistance 28 and a variable resistance 30 to bring this junction point to the potential of the constant component of the potential of the cathode of triode 12. A connection 32 to the switch 10 provides an input, which will be referred to in more detail hereafter, through the resistance 34 to the grid of triode 20. In similar fashion a line 36 provides through resistance 38 an input to the grid of triode 22. The resistances in series with the three grids of the multiplier triodes should be of equal high resistance values. The anodes of the three triodes 18, 20 and 22 are connected together and through a common load resistor 40 to the positive high potential supply line. A potentiometer 42 is arranged between the cathodes of triodes 20 and 22, and its contact 44 is grounded.

The operation of the multiplication circuit may be understood from the following brief considerations:

The resistances between the cathodes and ground are small and the grids of the triodes are either slightly positive or negative with respect to the cathodes under operating conditions depending upon the tube type. As is known, for low absolute values of potential of the grid with respect to the cathode for which grid current flows and for low grid current an exponential relationship between the grid current and grid-cathode potential exists. If each of the grid input resistors is large (e. g. 10 megohms), and each cathode-ground resistor is small, it may be readily seen that the grid-cathode potential of each of the tubes is, to a good degree of accuracy, proportional to the logarithm of the input potential plus a constant dependent almost solely on the grid input resistance. From this it will be found to follow that, with similar tubes, the common potential of the anodes (determined by the flow of the anode currents of all of the tubes through the resistor 40), will be quite closely equal to the sum of a constant and the negative logarithms of the various input potentials, each logarithm being multiplied by an individual constant. Consequently the common anode potential is the logarithm of the product of a constant and the reciprocals of all of the input potentials, each raised to the power of its individual constant. The individual constant exponents may be independently set by adjustment of the cathode-ground resistances. As a special case the exponents may be set to equality so that the result is linearly related to the logarithm of the product of the input potentials. It will be evident that the adjustments at 26 and 44 suffice to set the independent relative exponents of the three tubes. If required, individual separate adjustments of the cathode-ground resistances of tubes 20 and 22 could be provided to make the exponents unity or any desired values in a useful range. Obviously, also, any number of triodes could be used to obatin the product of a corresponding number of variables.

This type of multiplication circuit is especially advantageous in view of the use of the common anode resistor 40 which reduces changes of exponents of the variables relatively to each other due to relative variations in anode potentials. It has been found, for example, that with two triodes, each consisting of one-half a 12AU7 tube, products have been obtainable between 500 and 15,000 volts² with an accuracy of better than ±1% using input voltages ranging between 10 and 150 volts.

The multiplying circuit which has just been described is actually used in the present apparatus as a dividing circuit in that the product which appears at the anodes of the triodes 18, 20, and 22 is maintained at a constant value while there are fed to the inputs of triodes 18 and 20 time-varying functions of externally predetermined types so that under control of other elements hereafter described there is provided at the input to the triode 22 a function which automatically is proportional to the reciprocal of the product of the inputs to triodes 18 and 20 with the constant of proportionality determined by the value of the constant voltage maintained at the common anodes of the tubes. The maintenance of the constant voltage is described later.

There will be next considered the circuit fed through connection 46 from the cathode of triode 12 of the follower arrangement comprising the triodes 12 and 14. This line feeds through condenser 48 the grid of the first triode 50 of an alternating current amplifier. The anode of triode 50 is provided with a load resistance 52 and the anode is connected through condenser 53 and connection 54 with the grid of the second stage triode 56 of this amplifier. The anode of triode 56 is provided with a load resistance 58 and is connected through fixed resistance 60 and variable resistance 62 to the cathode of triode 50 which in turn is connected through resistances 64 and 66 to the negative high potential supply line. The junction of resistances 64 and 66 is connected through resistance 67 to the grid of triode 50. The grid of triode 56 is connected through resistance 63 to ground. The cathode of triode 56 is connected to ground through resistance 65 which is bypassed by condenser 69.

The amplifier just described is of a type providing an over-all gain of the value of potential appearing at terminal 2 by a factor of two. The output of the amplifier is then applied to an adding circuit having a low output impedance follower which circuit will now be described.

Connected to the anode of triode 56 is a resistance 68 connected to the grid of a triode 70. Also connected to this grid is a resistance 72 which should be precisely equal to the resistance 68. This resistance 72 is fed from the line 37, the signals in which will be referred to hereafter. The arrangement is such as to add the signals which enter through the resistances 68 and 72.

The cathode of triode 70 is connected to ground through a resistance 74 which is equal to a load resistance 76 connected the anode of triode 70 to the positive high potential line. A triode 78 has its grid connected through the resistance 80 to the anode of triode 70 and this grid is connected through resistance 82 to the negative potential supply line. The triode 78 has an anode load resistor 84 while its cathode is grounded. A connection 86 joins the cathode of triode 70 with the cathode of triode 90 which has its anode connected to the positive high voltage supply line through connection 94 while its grid is connected at 92 to the anode of triode 78. A connection 88 joins the connection 86 with the switch arm 6.

The adding arrangement just described adds the signals entering the resistances 68 and 72 and divides their sum by two. As will appear hereafter each of these signals at the input has been previously multiplied by two so that there will appear at the switch arm 6 a potential which is the sum of two input potentials of significance plus a steady state D. C. potential, which has no dynamic effect when the apparatus is cycled repetitively.

The line 37 previously referred to is connected to the input of a gated voltmeter circuit (Figure 2B) comprising the triodes 98, 118 and 134 and the diodes 104, 106 and 128 and their connections. A signal is fed from line 37 to the control grid of triode 98 through a resistance 96 which in combination with resistance 97 provides predetermined attenuation of the input signal. Triode 98 is arranged as a cathode follower having its cathode connected to the negative high voltage supply through resistor 100. The output from the cathode of triode 98 is fed through resistance 102 to the connected anodes of diodes 104 and 106. The cathode of the former is connected through resistance 112 to the negative potential supply line and through condenser 110 to a terminal 108 which, as will appear hereafter, receives a narrow positive synchronizing pulse at zero time of the repetition cycle. The cathode of diode 106 is connected through condenser 114 to ground and is connected at 116 to the grid of the triode 118 which is in a cathode follower arrangement, the cathode being connected to the negative high voltage supply line through resistances 120 and 122, the junction of which resistances is connected through resistance 124 to the cathode of diode 106 and grid of triode 118. The cathode of triode 118 is connected at 126 to the anode of diode 128, the cathode of which is connected to ground through condenser 130. The cathode of diode 128 is connected through lead 132 to the grid of triode 134 in a cathode follower arrangement with its cathode connected through resistances 136 and 138 to the negative high voltage supply line, the junctions of resistances 136 and 138 being connected through resistance 140 to the cathode of diode 128 and grid of triode 134. Condensers 114 and 130 provide an integrating arrangement so that a direct output passes from the cathode of triode 134 through connection 142 to a microammeter 144 which is connected to the contact 146 of a potentiometer 148 extending between the positive voltage supply line and ground, the potentiometer arrangement being for the purpose of providing zero setting.

The arrangement of the gated voltmeter is such as to provide an output to meter 144 corresponding to the value of the input function at the grid of triode 98 at zero time. This result is effected through the gating action of the diodes 104 and 106. In the absence of a positive synchronizing pulse at zero time at terminal 108 the cathode of diode 104 is at a negative potential with the result that its anode is also at a negative potential with respect to ground and this is, of course, true of the connected anode of diode 106. The diode 106 is accordingly effectively cut off, the positive signals applied to its anode being of a magnitude insufficient to overcome the bias of the anodes. When, however, a positive synchronizing pulse appears at zero time at terminal 108 the diode 104 is cut off and consequently the potential of the connected anodes rises for an instant towards that appearing at the cathode of triode 98. A positive pulse is thus delivered to the condenser 114 and the charge on this condenser rapidly builds up to very nearly the peak value of the potential of the cathode of triode 98 during the time of the gating pulse. During the time after the gating pulse the potential of condenser 114 decays slowly toward a negative potential through resistor 124. Thus, a positive waveform, having a peak value equal to the peak value of the waveform of the cathode of triode 98 during the gating pulse, is applied to the grid of triode 118. Because of the relatively slow decay of this waveform it should be noted that the waveform will be very near the peak value for a period much longer than the gating pulse. This waveform, transferred to the cathode of triode 118, is then applied through diode 128, thus charging capacitor 130 (having much greater capacitance than capacitor 114) which charges to very nearly the peak value of the waveform at 126. The discharge time constant of capacitor 130 through resistor 140 is such that very little decay occurs during the interval between successive gating pulses so that a steady state potential at the cathode of triode 134 is obtained representing the value of the potential waveform at the grid of triode 98 at the time of the gating pulse applied at 108. The variable resistor in series with the meter 144 permits adjustment of the meter scale factor, accounting for the input attenuator at the grid of triode 98 and also for the slight loss in gain through the three cathode follower stages. The D. C. level introduced by the followers and diodes is balanced out by adjustment of contact 146 of potentiometer 148, the adjustment being such that meter 144 reads zero when the input to triode 98 is at zero potential.

The output appearing at the cathode of triode 134 is fed through connection 150 and resistance 152 to the input of a differential amplifier which comprises the triodes 156 and 158 (Figure 2A).

The signals delivered through resistance 152 are applied to the grid of triode 156 which grid is connected through resistance 154 to the negative high voltage supply line and to ground through condenser 155. The grid of triode 158 is connected to the potentiometer contact 170 adjustable on the potentiometer resistance 168 which through flanking resistors 164 and 166 is connected between ground and the negative high voltage supply line. The cathodes of triodes 158 and 156 are connected together and through resistance 160 to the negative high voltage supply line. The anode of triode 156 is directly connected to the positive high voltage supply line while the anode of triode 158 is provided with a load resistor 162 and has an output connection 172 joined to the grid of triode 178 by resistance 174. Between the grid of triode 178 and ground there is the condenser 176 and the arrangement of resistance 174 and condenser 176 is such as to provide integration for a purpose which will become clearer hereafter.

The triode 178 is associated with a second triode 182 to provide the first stage of a differential amplifier. The anode of triode 178 has a load resistor 180 and the anode of triode 182 has a load resistor 186. The cathodes of the two triodes are joined and connected through resistor 184 to the negative supply line. The grid of triode 182 is connected to the anodes of triodes 8, 20 and 22 through line 188.

A second stage of the differential amplifier is provided by a pair of triodes 190 and 192. The cathodes of these are joined and connected through resistance 194 to the negative high voltage supply line. The grid of triode 190 is connected to the anode of triode 178 through resistance 196, while the grid of triode 192 is connected to the anode of triode 182 through an equal resistance 198. Equal resistances 200 and 202 join the grids of respective triodes 190 and 192 to the terminals of a potentiometer resistance 204, the contact 206 of which is connected to the negative supply line and is adjustable to provide balancing of the circuit.

The anode of triode 192 is provided with a load resistor 208 and is connected to the grid of a triode 210, the cathode of which is provided with load resistors 212 and 214, the latter being connected to the negative supply line. The junction of resistances 212 and 214 is connected through resistance 216 to the grid of triode 190 and is connected to ground through condenser 218. The output from the differential amplifier is delivered from the cathode of triode 210 through the line 220.

The output from line 220 is subjected to electronic switching through the use of a portion of the circuit which will now be described.

A terminal 222 (Figure 2B) receives a sharp positive synchronizing pulse at zero time as will be hereafter described, the source of this pulse being the same as that for terminal 108. This pulse is delivered through condenser 223 to the grid of a triode 224 which is associated with a triode 230 in a cathode coupled monostable multivibrator circuit. The grid of triode 224 is connected to the contact 226 of a potentiometer 228 located between the positive high voltage supply line and ground. The adjustment of this contact determines the lapsed time between initial tripping of the multivibrator and its return to its stable state. The cathodes of the two triodes 224 and 230 are connected and grounded through resistor 232. Anode load resistors are respectively provided at 234 and 236. A condenser 238 connects the anode of triode 224 to the grid of triode 230, which grid is connected through resistance 240 to the positive supply line. A condenser 242 connects the anode of triode 230 to the junction of resistances 244 and 246 which at their outer terminals are respectively connected to the positive high voltage supply line and ground. The junction last mentioned is connected to the cathode of a diode 248.

A terminal 250 to which is applied a square wave as will be hereafter more fully described is connected through condenser 254 to the cathode of a second diode 256, this cathode being connected through resistance 258 to the positive potential supply line and through resistance 259 to ground. The arrangement of condenser 254 and resistance 258 provides differentiation of the square wave which is applied to the terminal 250 so as to give rise to sharp positive and negative pulses at the cathode of diode 256. The square wave which is applied to terminal 250 rises from a zero value at a time of minus 40 microseconds and returns to zero value at the time 1960 microseconds. (An explanation of these times will follow in connection with the description of the time control unit.) Accordingly, a negative pulse is transmitted through the diode 256 to the line 262 at the time 1960 microseconds, the positive pulse at minus 40 microseconds being blocked by the diode.

The cathode coupled monostable multivibrator comprising the triodes 224 and 230 and the connections already described operates as follows:

The triode 230 is normally conducting while the triode 224 is normally cut off. Upon the reception of the positive synchronizing pulse at terminal 222 at zero time the multivibrator is caused to assume its unstable state with the triode 224 conducting and the triode 230 cut off. When this transition occurs a positive pulse is imposed on the cathode of diode 248 but is blocked thereby. At some later time, $t_c$, determined by the setting of potentiometer contact 226, the multivibrator reverts to its stable state, the triode 230 again becoming conductive while the triode 224 is cut off. The result is to emit a sharp negative pulse through condenser 242 to the cathode of diode 248, which pulse is transmitted to the line 260.

In résumé of the above, it may be noted that a negative pulse is delivered to the line 260 at a time equal to $t_c$ while a negative pulse is transmitted to the line 262 at a time 1960 microseconds.

A pair of triodes 264 and 266 are connected in a conventional flip-flop to provide square wave switching. The cathodes of these triodes are connected to the negative supply line through resistance 268 and condenser 270. The anode of triode 264 is connected to the line 260 and, through a resistance-capacity network 271 and connection 272, to the grid of triode 266. In similar and symmetrical fashion the anode of triode 266 is connected to line 262, and through the resistance-capacitance network 273 and connection 274 to the grid of triode 264. The grids of triodes 264 and 266 are respectively connected to the negative high voltage supply line through resistances 282 and 284. The anodes of triodes 264 and 266 are respectively connected through resistances 276 and 280 to the positive high voltage supply line.

The action of the flip-flop may be described as follows:

The triode 264 is cut off at the time 1960 mircoseconds whereas the triode 266 is cut off at the time $t_c$. The result is the emission on the line 286 connected to the anode of triode 264 of a positive pulse which begins at the time 1960 microseconds and lasts until the time $t_c$ of the next cycle. On the other hand, there is emitted on the line 288 connected to the anode of triode 266 a positive pulse which begins at time $t_c$ and lasts until the time 1960 microseconds. The lines 286 and 288 are respectively connected to the grids of a pair of triodes 290 and 292 arranged as cathode followers, being provided with cathode load resistors 294 and 296, respectively, connected to the negative high voltage supply line. The outputs of these cathode followers are respectively delivered on the lines 298 and 300 and correspond respectively to the inputs on lines 286 and 288.

A four-diode switch is provided by diodes 302, 304, 306 and 308 connected as shown. The diodes 302 and 304 are in series, with the cathode of the former connected to the anode of the latter and through connection 316 to line 220. The diodes 306 and 308 are similarly in series with the cathode of the former connected to the anodes of the latter and to the output line 318. A resistance 310 connects the joined anodes of diodes 302 and 306 to the line 298, while the joined cathodes of diodes 304 and 308 are connected through resistance 314 to the line 300. Output line 318 is connected to the grid of a triode 322 which is arranged as a cathode follower with a cathode resistance 324. The grid of this triode is connected to ground through condenser 320. The output from its cathode is delivered through line 326 to the line 37 previously described.

The switching arrangement just described operates as follows:

At the time 1960 microseconds in one cycle the anodes of the diodes 302 and 306 become positive with respect to the cathodes of diodes 304 and 308 so that, the diode resistances being quite low under conducting circumstances, there may be assumed an essential zero potential drop between the anodes of the upper diodes and the cathodes of the lower diodes. At any rate, the cathodes of diodes 302 and 306 are necessarily at substantially the same potential. Accordingly, there is an effective connection between the input line 316 and the output line 318 so that the latter follows the former delivering its signal to the grid of triode 322 and to the output line 326. This condition continues until the time corresponding to $t_c$ in the next cycle when the polarities are reversed and consequently the diodes are cut off. Under these circumstances the input line 316 is completely isolated from the output line 318 and since the diodes are cut off the grid of triode 322 remains at the potential to which the condenser 320 was charged at the time of cut off. This condition continues from the time $t_c$ until the time 1960 microseconds when reverse switching again occurs as previously described. (Time $t_c$, it may be noted, is always less than 1960 microseconds during operation.)

A second four-diode switch is provided by the diodes 328, 330, 332 and 334 connected in essentially the same fashion as those of the switch previously described with the exception that the connected anodes of diodes 328 and 332 are connected through resistance 336 to line 300, whereas the connected cathodes of diodes 330 and 334 are connected through resistance 338 with the line 298. Thus the polarity connections of this second switch arrangement are the reverse of those of the one first described. The input to the switch is provided through connection 340 from the line 220, the connection being to the junction of the cathode of diode 332 and the anode of diode 334. The output line 341 from the connection between the cathode of diode 328 and the anode of diode 330 runs to the grid of the triode 342 arranged in a cathode follower circuit, the cathode having a load resistor at 354. The output from the cathode follower is through the line 356 to line 358 and contact 360 of the switch 10 which connects to the line 32. The grid of triode 342 is connected through resistance 344 to a switch 346 which is selectively adapted to make contact with a point 347 connected to an input terminal 348 or a point 350 connected to an input terminal 352. As will appear hereafter, an arbitrarily chosen variable function is applied to the terminal 348 under normal operating conditions from the gas cap function integrator, and the switch 346 is normally joined to this terminal. Alternatively, in its other position the switch is connected to the terminal 352 to which another suitable function may be applied during operation.

The operation of the switching arrangement last described is as follows:

From the time $t_c$ until time 1960 microseconds the anodes of diodes 332 and 328 are positive and the cathodes of diodes 330 and 334 are negative. Accordingly, as in the case of the other switching arrangement the diodes are conductive and provide essentially a short circuit between the anodes of the upper diodes and the cathodes of the lower diodes, so that the signal appearing on line 220 is transmitted to the grid of triode 342 and is emitted along line 356. While at this time there may be an additional input at terminal 348 this input, as will appear hereafter, is from a relatively high impedance whereas the output impedance to the line 220 is low. Accordingly the signal from the line 220 will swamp out the signal from the terminal 348. On the other hand, in contrast with the above the diodes are non-conducting during the period extending from the time 1960 microseconds of one cycle until the time $t_c$ of the next cycle. The input is then isolated from the output and the grid of triode 342 is controlled by a signal from terminal 348 or, if desired, from terminal 352.

The line 356 above mentioned has connected to it the line 362 which through resistance 364 runs to a contact point 366 of a group including 368 and 374, the latter of which is grounded. The contact 366 is connected to ground through resistance 367. The contact 368 is connected through line 370 to the grid of triode 98.

A switch arm 372 cooperates with the contacts just mentioned and is connected to the grid of a triode 376 which is the input triode of a gated voltmeter circuit which may be identical with that previously described having triode 98 in its input stage. The voltmeter including the triode 376 comprises the diodes 380 and 382, triode 384, diode 386, triode 388, and microammeter 390, all of which are in connections such as those previously described for the first mentioned gated voltmeter. It will, accordingly, be evident that this last mentioned gated voltmeter may respond to the same signals as that first mentioned or, alternatively, may respond to signals entering at contact 366. Whereas a synchronizing pulse was introduced to the first gated voltmeter at zero time, in the case of the one now under consideration a timing pulse of delayed type is introduced at terminal 392 so that the sampling of whatever time variable function is introduced is at some delayed time. The control of the delayed pulse which samples the function will be clear hereafter from the description of the time control unit.

The operation of the circuit so far described may be best understood by first considering the operation of that portion of the circuit involving a condenser 4 selected by the switch 6.

The potential at terminal 2, amplified by a factor of two by triodes 50 and 56 appears at the anode of the latter. A potential appears at the line 37 as hereafter described but this may presently be considered arbitrary. As the result of addition effected through connected resistors 68 and 72, there appears at the lower terminal of the selected condenser 4 a potential which is equal to that at terminal 2 plus half the potential of line 37, plus a steady state D. C. potential of no dynamic consequence. Accordingly, neglecting its steady state component, the potential across the condenser, being the difference between the potentials of its lower and upper terminals, is one half the potential of line 37 with the lower terminal of the condenser positive with respect to the upper. A charge then exists in the condenser corresponding to the product of this condenser potential by the capacity of the condenser. As will appear hereafter the condenser potential has a generally reciprocal relationship to the potential of terminal 2, and it follows that, as the value of potential at terminal 2 decreases, the charge of the condenser generally increases, this statement being subject to exceptions and being here made only to present a clarifying picture of operation. The result of this is that as the potential at terminal 2 decreases, current will generally flow in a direction from the upper plate of the condenser to the terminal 2, the effect, electrically, being that of the existence between terminal 2 and ground of a capacitance, generally positive, of a variable capacity value which is a function of the charge. The analogy thus afforded to gas cap conditions will be described hereafter in consideration of the overall operation.

There may now be considered the automatic controlling operations which are involved in the gas cap circuit.

Consider first the differential amplifier which comprises the triodes 156 and 158. This differential amplifier is so arranged that if the grid of one of these triodes has a potential departing from that of the other a large signal will be transmitted. It will now be shown that the connections are such as to give rise to a corrective action insuring that the potential of the grid of triode 156 is always substantially equal to the potential of the grid of triode 158.

The potential of the grid of triode 158 is set by the adjustment of contact 170 of potentiometer 168. Assume that for some reason the potential of the grid of triode 156 becomes more positive than normal by a small increment. Such a positive change of this grid will produce a positive signal through line 172 and a positive change of the potential of the grid of triode 178. This positive change in grid potential gives rise to a negative change of potential at the cathode of triode 210, a negative change at connection 316, and a negative change in connection 326 running from the cathode to triode 322. Through connection 37 this, in turn, produces a negative change of potential at the grid of triode 98. The gated voltmeter which contains as its initial tube the triode 98 will give out at zero time a negative signal through line 150 which is connected to the grid of triode 156 from which the changes just mentioned were initiated. Accordingly, a corrective action takes place, in view of the amplification involved, to maintain the grid of 156 precisely at the same potential as the grid of triode 158, the potential of the grid of triode 156 being that of zero time of the function which is introduced to the grid of triode 98. It will be evident from the foregoing that the meter 144 will measure the potential set for the grid of triode 158 by adjustment of the potentiometer contact 170.

There may next be considered the corrective action which involves the differential amplifier starting with triodes 178 and 182. The action of this differential amplifier is such as to maintain the grid of triode 182 precisely at the potential of the grid of triode 178. That the connections effect this result will be evident from the following.

Let there be assumed a negative incremental change of potential of the grid of triode 182. This will give rise to a corresponding negative change in potential in the line 220, and a corresponding negative change in the line 326. This negative change is transmitted through connection 36 to the grid of triode 22 and, as described heretofore, the result, by virtue of the multiplying action, will be that of a positive change in connection 188 to the grid of triode 182. The result is a compensating action which will maintain the grid of triode 182 at the potential of triode 178 which in turn is set by the adjustment of the contact 170 of potentiometer 168.

From the foregoing it will be evident that the product (logarithmically represented) emerging through connection 188 is maintained at a constant value. Inasmuch as the potential of the grid of triode 158 which is that corresponding to the value of the function entering the triode 98 at zero time, the constant value of the product maintained at 188 may be considered to be the value of this product at zero time.

The water drive analog will now be described. This is illustrated in Figure 3 and comprises a series of resistances 402, the junctions of which are connected to ground through capacity elements which are indicated at 404. In view of the fact that these capacity elements require a wide range of adjustment and relatively high capacity values there are used in this network dynamic capacity elements which are similar to each other so that only one of these is detailed as indicated at 404', it being understood that all of the individual elements 404 are constructed as illustrated at 404'. The resistances 402 of the network are shown as variable but in practice there are preferably used, instead of continuously variable resistors, sets of resistors which are chosen into the circuit by switching. In the same fashion the condenser 406 is shown as variable but since these condensers 406 are of relatively large capacity values it is preferable in actual practice to utilize groups of fixed condensers which are selectively switched into the circuit. It is also generally desirable to provide resistance and capacity units which may, as a whole, be switched into and out of the circuit. However, such details are arbitrary and are not illustrated. Generally for good reproduction of an actual water drive network a considerable number of network sections are involved. There may, for example, be fifteen or more of these sections, and the multiplicity is indicated by the use of dotted lines in the showing of the network.

Referring now particularly to the capacitance element indicated at 404' (which also includes a charging arrangement) it will be noted that each such element comprises a condenser 406 connected to a corresponding junction between resistances by a line 408. The value of the capacity provided by the condenser 406 may be alternatively divided or multiplied. The range for each condenser may involve, for example, from about one-tenth to about fifty times its capacity value and it will be evident, therefore, that by the use of a limited number of interchangeable condensers a very large range of capacities may be provided. As will appear the adjustments of capacity are continuous. It is not necessary in practice to have the resistances of the network continuously variable so that a reasonable number of fixed resistances may be provided and switched into the circuit as indicated above.

The upper terminal of the condenser 406 is connected at 410 to the grid of a triode 412 in a cathode follower arrangement, there being provided between the cathode and ground a potentiometer resistance 414 associated with a variable contact 416. This variable contact arrangement provides between the contact 416 and ground a potential varying from approximately the value of the potential between the grid and ground to some limiting fraction thereof as, for example, one-tenth the value of the grid potential. A condenser 418 connects the contact 416 to the grid of an amplifying triode 420. This triode is associated with an anode load resistor 422 and the cathode is connected to ground through a cathode resistor 423. The amplification of the amplifier just mentioned may be set by a proper choice of the cathode resistor 423. This amplification may vary, for example from unity to about fifty. The anode of triode 420 is connected at 424 to a contact 425 engageable by a switch arm 428 which is alternatively engageable with contact 427 connected to the potentiometer contact 416 through line 426.

Considering the arrangement so far described, assume that the switch 428 engages contact 427. It will then be evident that at the switch there will appear a potential which may vary from approximately the value of the potential of the grid of triode 412 to some small fraction thereof depending upon adjustment of potentiometer contact 416. Division of the potential appearing at the grid of triode 412 is thus effected, the potential of the switch 428 being the same as that of the grid.

On the other hand, if the switch 428 engages contact 425, the output at the potentiometer contact 416 is amplified to the degree afforded by the amplifier including triode 420 and the potential appearing at 428 will be of a sign opposite that appearing at the grid of triode 412, or, in other words, the phase of the input is reversed. In short, considering both adjustments of the switch 428, the inphase output of the arrangement may be any chosen fraction of the input or, alternatively, the out-of-phase output may be either a fraction or a multiple of the input. As will become evident hereafter a repetition cycle is involved so that only alternating signals need be considered, these being delivered from switch 428 through condenser 430.

Following condenser 430 there is an improved cathode follower circuit which is capable of giving a very accurate correspondence of input to output potential irrespective of output current drain by reason of a very low output impedance of the follower circuit. As will appear the condenser 406 constitutes a load on this cathode follower circuit and it is very important that the output should be linearly related to a high degree of accuracy to the input in order that the effective dynamic capacity will be constant irrespective of the charges or currents which are involved. This last result cannot be secured to a sufficient degree of accuracy with an ordinary cathode follower, and hence there is used the circuit which will now be described and which is of more general applicability and constitutes an important phase of the invention.

A pair of triodes 432 and 434 are arranged in a differential amplifying circuit by having their cathodes connected together and to ground through a resistance 436. The anode of triode 434 is provided with a load resistor 438 which is connected through resistance 440 to the grid of a cathode follower triode 444 which grid is connected also to ground through resistance 442 to provide the necessary initial direct bias of the grid. It will be noted that the grid of triode 432 is also positively biased by connection to the junction of resistors 433 and 435 connected between the positive high voltage supply line and ground. The cathode of triode 444 is connected to ground through the load resistor 446 and is connected to the grid of triode 434 through line 448.

The general characteristics of the improved cathode follower arrangement may now be described. Assume that a particular potential is applied at any instant to the grid of triode 432. Assume also that the cathode of triode 444 is at a potential differing from the potential of the grid of triode 432. This cathode potential appears at the grid of triode 434 with the result that a signal appears at the anode of triode 434 which is a measure of the difference of potential of the two grids of the respective triodes 432 and 434. This output is subjected to amplification depending upon the choice of resistances 436 and 438 and this amplification may be quite considerable. The result is that the potential of the grid of triode 444 is caused to vary in such fashion as to drive the potential of the cathode of triode 444 to a value very closely corresponding to the potential of the grid of triode 432, so that the potential of the grid of triode 434 is substantially the same as that of the triode 432. In view of the amplification involved in the differential amplifier this action is independent to a very high degree of the characteristics of the tubes involved. Accordingly, irrespective of the current which may be drawn from the cathode of triode 444 that cathode will always have a potential which is very nearly equal to the potential introduced at the grid of triode 432. As a result a very good linear characteristic is secured. The above may be otherwise stated as involving a very low output impedance for the circuit so that the circuit as a whole amounts to a transformer which may match a high impedance to a very low impedance.

The characteristics of the improved cathode follower circuit may be made clear from consideration of Figure 8 at the top of which there is shown the circuit, generalized to some extent over the circuit as shown in Figure 3 by having the connection corresponding to 448 made not to the cathode of the output triode but to a contact engaging an impedance substituted for the fixed resistance 446, this impedance being indicated as a resistance though it may be any desired impedance.

Considering first the differential amplifier portion of the circuit its characteristics are indicated by Equation 1 in which G and H are as given in 2 and 3. This, in general, indicates the characteristics of various differential amplifiers shown herein. (It will be understood that derivation of all of the equations in Figure 8 involves the usual assumptions made in similar derivations of equations of vacuum tube circuits.)

Equation 4 indicates the characteristics of the complete cathode follower circuit, the expression $K_G$ being indicated at 5, the other parameters being as shown on the circuit diagram and G and H being as above stated.

If Equation 4 is compared with the usual expression for cathode followers, it will be seen that the product of the first three factors of $E_I$ corresponds to the usually given amplification which, if $K_L$ is unity, will be less than one and will vary very little with considerable variations of tube characteristics, while the last term contains the load impedance in the conventional fashion and indicates the reduction of the effective plate resistance.

It will be evident from the last term that the equivalent plate resistance will be very low in view of the large attainable magnitude of the quantity dividing $R_p$. It is easily possible to attain with this circuit an equivalent plate resistance of less than 10 ohms. It will be evident that this equivalent plate resistance is minimum when $K_L$ is unity, so that a very low output impedance may be achieved.

But, furthermore, the ratio of $E_L$ to $E_I$ may, if desired, be made unity or greater if $K_L$ is adjusted to be less than unity. Thus there may be attained an equality of input to output potential to a high degree of precision and highly independent of the current drawn from the output tube. The gain may be adjusted if the impedance $Z_L$ is a potentiometer the contact of which is variable.

In short, there is provided a power output stage of an amplifier having a very low impedance and this may be used in various fashions other than in the present circuit as, for example, for the driving of speaker coils of low impedance directly without the use of a transformer. It will, of course, be evident that by duplication of the circuit the arrangement may be made of a push-pull variety.

In the present instance the cathode of triode 444 is connected to the lower terminal of the condenser 406. That the entire arrangement constitutes a continuously variable condenser may now be made clear. If the switch 428 engages contact 427, the potential fed to the lower terminal of condenser 406 will be of the same sign as the potential fed to the upper terminal of this condenser so that there will appear across condenser 406 a potential which is some fraction of the potential between its upper terminal and ground. Accordingly, the effective capacity between connection 408 and ground is that of a condenser having a fraction of the capacity of the condenser 406, the value of this fraction being determined by the setting of potentiometer contact 416 and being continuously variable with the continuous variation of this contact.

On the other hand, consider the switch 428 in engagement with contact 425. There is then applied to the lower terminal of the condenser 406 a potential which is of opposite phase with respect to the potential applied to the upper terminal of this condenser and this potential applied to the lower terminal may be either a fraction or a multiple of the potential applied to the upper terminal depending upon the choice of resistance 423 and the setting of the potentiometer contact 416. Accordingly, the potential across the condenser will exceed the potential of its upper terminal with respect to ground and this potential across the condenser will be continuously variable with adjustment of contact 416. In view of this it will be evident that the system provides what amounts to a multiplication of the capacity appearing between the connection 408 and ground as compared with the physical capacity of the chosen condenser at 406.

It may be here noted that the dynamic capacity afforded by the arrangement just described is also of quite general applicability and forms per se an important phase of the invention. The potentiometer in the cathode circuit of triode 412 may be directly calibrated in terms of continuous variations of capacitance and in view of the fact that a large condenser of high grade and small leakage, for example of the order of two microfarads or more may be provided at 406 it will be evident that there may be provided an adjustable capacitance which may have an effective capacity of the order of several hundred microfarads. Such a dynamic capacitance may be used, for example, for filtering. Furthermore, in view of the inherent negative feed-back involved there is a very low effective series resistance so that, when used as a filter, low impedance filtering will not be impaired.

This is in contrast with the normal difficulty of securing high capacitances without leakage and, of course, of securing continuous variability of capacitances of high value.

To indicate the characteristics of the dynamic capacitance, reference may be made to Expressions 6 and 7. The former indicates the effective series resistance, $\epsilon$ being used to indicate the small fraction multiplying $R_p$ in Equation 4, $R_p$ being the plate resistance of the output triode as in Equation 4, $\alpha$ being the gain represented by the product of the first three factors of $E_I$ in Equation 4, and K being the amplification effected between line 410 and the input to the cathode follower circuit, being positive for multiplication, and negative and less than unity for division of the capacity value C of physical condenser 406. Obviously this effective series resistance may be made quite small, particularly if the capacity multiplication is large.

Expression 7 gives the effective capacity in terms of the capacity C of condenser 406 and the quantities K and $\alpha$ above defined. If an inductance is substituted in the position of condenser 406, its value may also be effectively multiplied or divided but in this case K must be negative for multiplication and positive for division.

The remaining portion of the apparatus indicated at 404' has to do with the initial charging of the capacitances in the network prior to zero time of the repetitive cycle of the analyzer.

A charging triode is indicated at 452 and has its cathode connected through resistance 453 to the upper terminal of the condenser 406. The grid of triode 452 is connected through resistance 454 to the contact of a potentiometer 456 which is connected between the positive supply source and ground. The grid of triode 452 is connected through condenser 458 to the cathode of a triode 460 in a cathode follower arrangement including the cathode load resistor 462. The grid of triode 460 is connected to a terminal 464 which, as will appear hereafter, is connected to a source of positive square waves of a timing circuit, the applied wave having its rise at the time 1960 microseconds and its fall at −40 microseconds, referred to the next cycle, the duration being 2000 microseconds.

In view of the presence of the condenser 458 it will be evident that the grid of triode 452 is subjected to a potential which varies as a square wave about a constant potential set by the position of the contact on potentiometer 456. The square wave is of accurately regulated amplitude and it will be evident that during the positive cycles of this wave the potential at the grid will be positive so that the triode 452 will be conducting and will charge the condenser 406, or rather the effective dynamic capacitance which has been described, to a potential at its upper terminal with respect to ground corresponding to the sum of the potential of the potentiometer contact and half the complete amplitude of the square wave, the current carrying capacity of the triode 452 being sufficient to permit full charging during the positive half cycle of the square wave. On the other hand, during the negative half cycle of the square wave the grid of triode 452 will be driven to cut off and, as will appear hereafter, the network will then deliver current through the withdrawal circuit which will be described.

While the elements including and to the right of condenser 458 are indicated as repeated in each of the assemblies 404', in practice such repetition is unnecessary and this portion of the circuit may be provided only once for a group of the assemblies 404'. In such case the triode 460 must be provided with adequate current carrying capacity and to this end the single triode indicated at 460 may be replaced by two or more triodes connected in parallel.

The terminal indicated at 2 in Figure 3 is connected to the correspondingly designated terminal of the gas cap analog (Figure 2A).

Figure 4A:
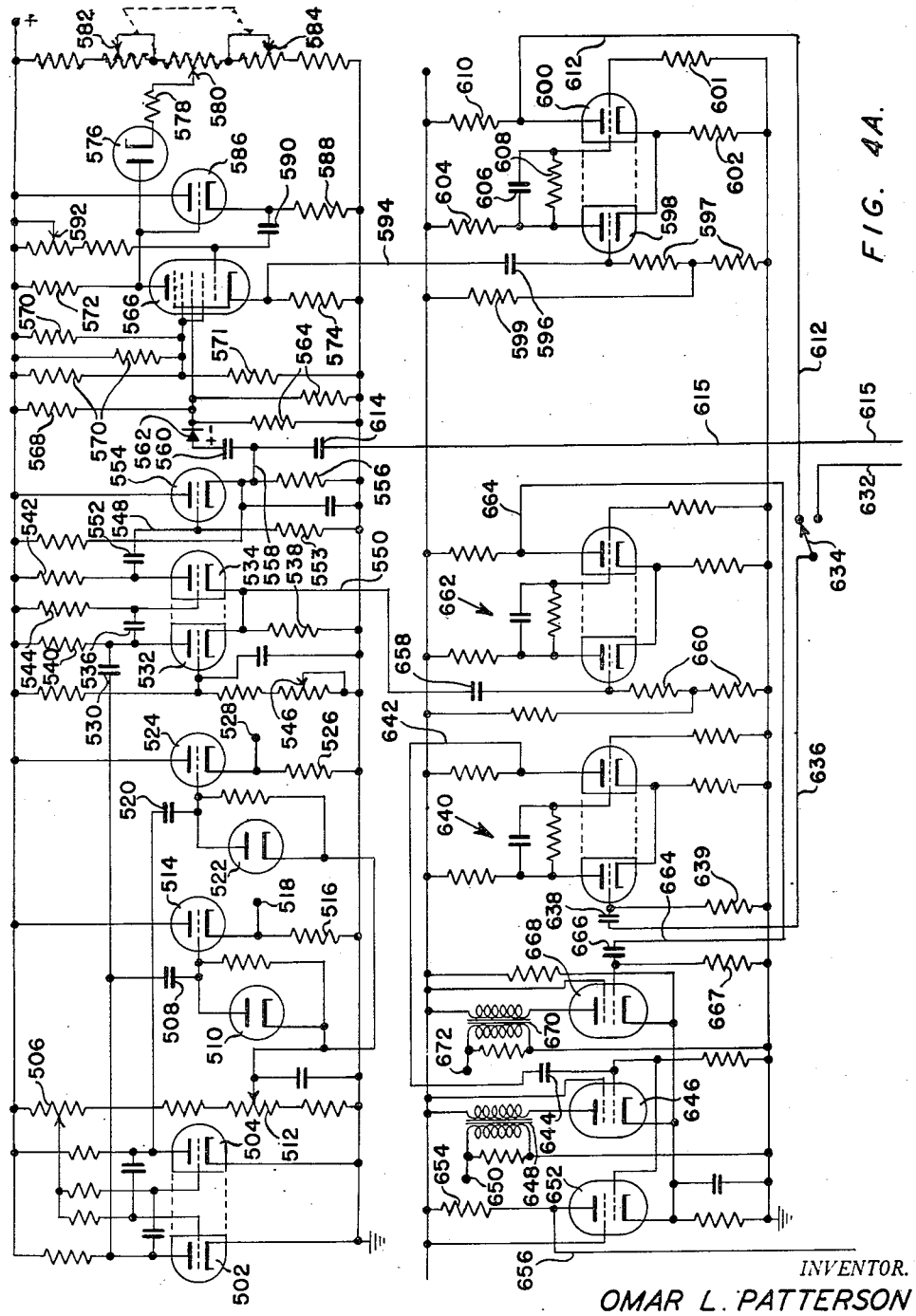
Figure 4B:
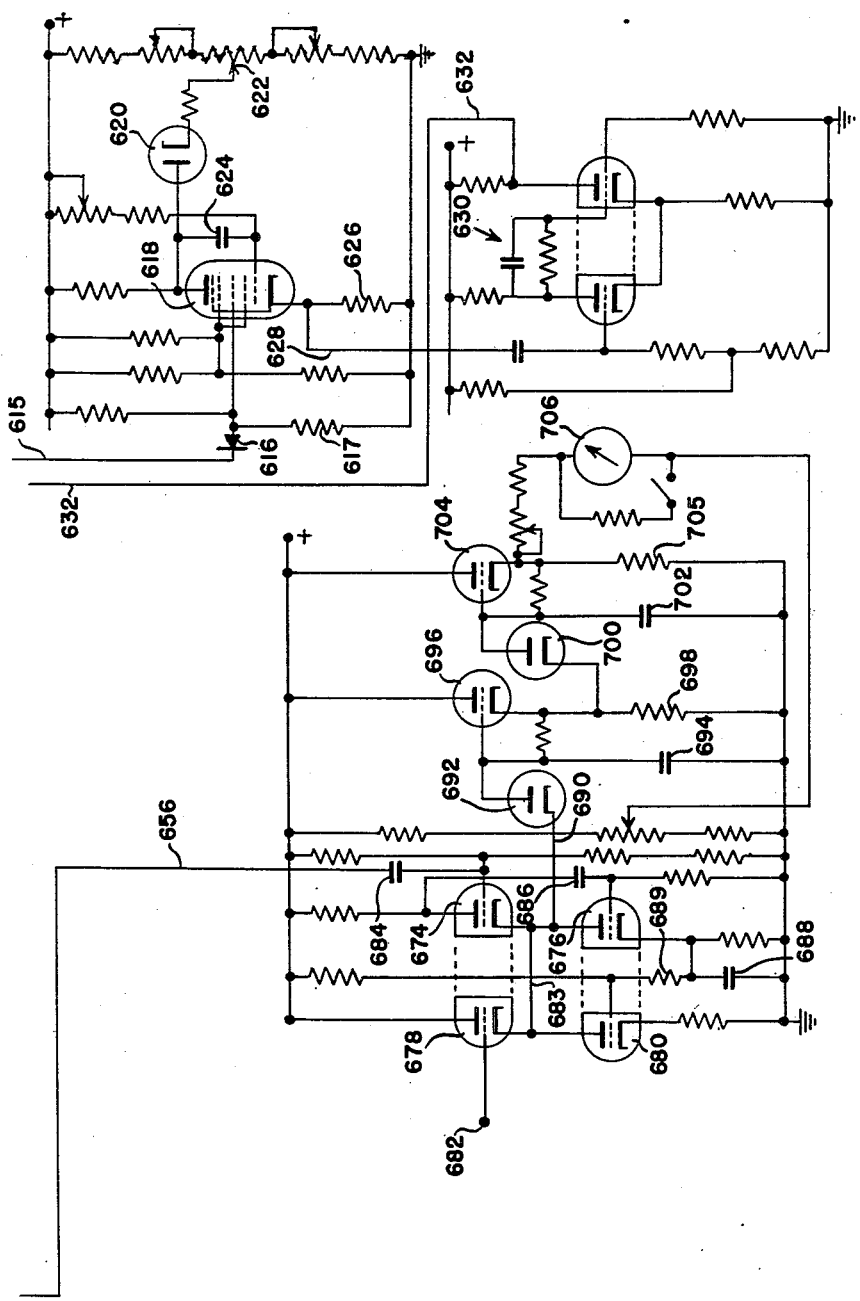

Figures 4A and 4B show the assembly for providing timing pulses and a gated voltmeter arrangement whereby wave forms appearing in the apparatus may be measured at predetermined and variable time intervals.

A multivibrator of conventional type comprising the triodes 502 and 504 and their connections provides an oscillator giving rise to square waves at a suitable frequency which may be assumed for consistency of description to be 250 cycles per second. Inasmuch as the circuit is symmetrical the positive and negative waves will be of approximately equal duration. The repetition frequency is adjustable through a contact of a potentiometer 506 included in a series of resistances between the positive potential supply line and ground, this series of resistances also including a potentiometer 512 having an adjustable contact.

The anode of triode 502 is connected through condenser 508 to the anode of a diode 510, the cathode of which is connected to the contact of potentiometer 512. The anode of diode 510 is connected to the grid of a triode 514 in a cathode follower circuit including the cathode resistor 516, the cathode being connected to an output terminal 518.

The anode of triode 504 is similarly connected through a condenser 520 to the anode of a diode 522, the cathode of which is also connected to the contact of potentiometer 512. The anode of diode 522 is connected to the grid of triode 524 in a cathode follower circuit including resistance 526, the cathode being connected to the output terminal 528.

The two similar circuits just mentioned have similar operation characteristics which will be described with respect to the former. Because of the use of the diode 510 it will be evident that the maximum positive potential of the grid of triode 514 will be essentially the potential of the contact of potentiometer 512, and this is true even though a substantially greater positive potential may be applied to the condenser 8 from the anode of triode 502. On the other hand, the grid of triode 514 may be driven to cut off by the large swing in a negative direction of the anode of triode 502. Since the potential of the cathode of triode 514 cannot drop below ground potential it will be evident that the application of a sufficient swing at the anode of triode 502 will result in the production of a square wave which is accurately fixed as to amplitude, the amplitude being approximately the potential of the contact of potentiometer 512 above ground.

In similar fashion a square wave is produced at output terminal 528 having the same amplitude. However, since the two arrangements are fed from the anodes of the tubes 502 and 504, respectively, the outputs will be displaced by 180°. Consistently with the frequency of 250 cycles per second heretofore mentioned, it will be evident that the square waves will have durations of approximately 2000 microseconds each. It will be hereafter assumed for simplicity that the multivibrator is in fact symmetrical so that each square wave will be assumed to be of 2000 microseconds duration. Actually their precise correspondence is unimportant.

The anode of triode 502 is connected through condenser 530 to a delay flip-flop (a monostable cathode coupled multivibrator) which comprises triodes 532 and 534 in conventional arrangement. The cathodes of these triodes are joined and share a common cathode resistor 538 to ground. The anode of triode 532 is connected through condenser 36 to the grid of triode 534. The anode of triode 532 has a load resistor 540 while the anode of triode 534 has a load resistor 542. A resistor 544 connects the grid of triode 534 to the positive high potential supply line. The delay adjustment of the flip-flop is indicated at 546, this adjustment serving to adjust the potential of the grid of triode 532. Triode 534 is normally conducting while triode 532 is normally cut off. A positive pulse entering on the line from the anode of triode 502 is applied to the grid of triode 534 but has no effect thereon since triode 534 is already conducting. The rise of the square wave applied to condenser 530 is differentiated to produce a positive pulse which is without effect on the triode 534 inasmuch as the grid is already positive and this grid is conducting. On the other hand, at the end of the square wave produced at the anode 502 differentiation applies a negative pulse to the grid of triode 534 which is rendered nonconductive while at the same time the triode 532 is rendered conductive. This unstable state of the flip-flop continues for a short time determined by the adjustment at 546 whereupon the flip-flop reverts to its stable state. As a result there is produced a positive pulse at the anode of triode 534 which is emitted through connection 548. The rise of this positive pulse coincides with the rise of the square wave appearing at terminal 528. Adjustments are so made that the duration of the pulse at connection 548 is of the order of 40 microseconds and it will be assumed hereafter that this delay is involved between the initiation and termination of this pulse.

For reasons which will appear more clearly hereafter the end of the pulse at connection 548 is taken as the zero time for the repetition cycle. It follows, therefore, that the rise of the pulse appearing at terminal 528 occurs at a time minus 40 microseconds. It may be here briefly stated that the purpose of this is to insure that zero time occurs during a stabilized operation of phantastrons which will be shortly described. Furthermore, the delay is such that transients which are produced at the time of rise of the square wave at terminal 28 may die out before zero time. It follows that the end of the square wave at terminal 528 occurs at time 1960 microseconds and that this is the time of rise of the square wave at terminal 518.

The pulse which occurs at connection 548 is differentiated by the arrangement of condenser 552 and resistance 553 and is applied to the grid of triode 554 which is arranged as a cathode follower. The output from the cathode of this triode is delivered through connection 558, condenser 560, diode 562, which may be of crystal type, to the third grid of a pentagrid converter shown at 566. Resistances 564 connect this grid to ground and as will be evident the arrangement provides further differentiation so that a very sharp pulse is applied to the third grid of the converter tube. In view of the presence of diode 562 only the positive differentiated pulse is applied to this grid.

The tube 566 is in a phantastron circuit the components of which will now be described. The normal potential of the third grid of tube 566 is adjusted by the use of resistance 568 in conjunction with the parallel resistances 564. The second and fourth grids of tube 566 are of the same potential maintained by the arrangement of resistances 570 in parallel together with resistance 571, the arrangement of resistances being between the positive potential supply line and ground. An anode load resistor 572 of high value is provided between the anode of tube 566 and the positive potential supply line. A relatively low cathode resistor 574 connects the cathode of tube 566 to ground. The anode of tube 566 is connected to the anode of diode 576, the cathode of which is connected through resistor 578 to the contact 580 of a potentiometer which is arranged in series with other resistances between the positive potential supply line and ground. The adjustment of contact 580 determines the time delay in the phantastron operation. Zero adjustment is effected through adjustment of other resistances of the series by contacts 582 and 584 which are ganged. A triode 586 has its anode directly connected to the positive potential supply line and its cathode is connected to ground through resistor 588. A cathode follower arrangement is thus provided, the grid of triode 586 being connected to the anode of tube 566. The cathode of triode 586 is connected through condenser 590 to the first control grid of tube 566. This first grid is connected to the positive potential supply line through a resistance which is adjustable by contact 592. The output from the phantastron is delivered from the cathode of tube 566 through line 594.

The phantastron just described is generally conventional and its operation need not be detailed. However, to indicate its operation briefly it may be stated that the positive sharp pulse received at the third grid of tube 566 initiates a slow linear drop of potential of both the anode of tube 566 and its cathode, the slow action being due to the feed-back from the anode of tube 566 through the cathode follower comprising the triode 586 and condenser 590 to the first grid of tube 566. This drop of potential continues until the plate current approaches its minimum value whereupon the feed-back action suddenly ceases and the circuit is restored suddenly to its initial condition. The result is a square wave emitted through output line 594, the duration of which is dependent upon the initial potential of the anode of tube 566 as set by the adjustment of potentiometer contact 580.

It may be here remarked that the cathode follower including triode 586 is provided to secure an accelerated restoration to initial condition.

The square wave emitted on line 594 is differentiated by condenser 596 and the arrangement of resistors 597 and 599 delivering a positive pulse at the grid of triode 598. The resistors 597 and 599 provide a normal potential for the grid of triode 598 associated with a second triode 600 in a cathode-coupled bistable multivibrator circuit. The cathodes of triodes 598 and 600 are connected together and through a common resistor 102 to ground. The anode of triode 598 is connected to the high positive potential supply line through resistance 604 and through the parallel arrangement of condenser 606 and resistance 608 to the control grid of triode 600 which is connected to ground through resistance 601. The anode of triode 600 is provided with a load resistor 610 and is arranged to deliver its output through line 612. In the operation of this cathode-coupled bistable multivibrator arrangement the triode 600 is normally conducting while the triode 598 is cut off. Upon reception of the differentiated pulse the grid of triode 598 renders triode 598 conductive and serves to cut off the triode 600, the action commencing when the positive pulse at the grid of triode 594 exceeds a value determined by the circuit constants. The circuit returns to initial condition when the pulse at the grid of triode 598 goes below a value determined by the circuit constants. This latter value of voltage is somewhat below the value at which the action is initiated due to the characteristic hysteresis of this type of circuit. The duration of the positive pulse consequently emitted on line 612 is unimportant but the action of this flip-flop is provided to secure a fast rise time for this pulse. Before proceeding with a description of further pulse forming portions of the circuit reference may be made to a second phantastron and second trigger generator or pulse former corresponding to that just described. The second phantastron comprises a tube 618 of pentagrid converter type in a phantastron circuit which also includes diode 620. The input to the third grid of tube 618 is obtained from connection 558 through condenser 614, line 615 and diode 616, which may be of crystal type, associated with a resistance 617 to provide differentiation. The phantastron circuit now being described is generally similar to that already described except that the cathode follower feed-back to the first grid of tube 618 is omitted, the anode of tube 618 being connected to this first grid through condenser 624. The reason is that this phantastron is used only for the timing of short periods as compared with the timing of long periods by that first described and as a consequence there is no necessity for insuring a rapid recovery. The time delay of the phantastron now under discussion is adjusted by the potentiometer contact 622 connected to the cathode of diode 620. The output is delivered through line 628 connected to the cathode of tube 618 which is connected to ground through the resistance 626. The output from line 628 is fed to a circuit 630 which is in all respects similar to that described above and comprising the triodes 598 and 600, the purpose of this cathode-coupled bistable multivibrator circuit being to provide a sharp output pulse or rather an output pulse having a quick rise time through the line 632.

The output lines 612 and 632 are connected to the contact points of a switch 634 arranged to connect either alternatively to the line 636. The reason for providing two phantastron circuits, the former for long time delays and the latter for short time delays, is to secure an added accuracy when short time delays are to be involved, the accuracy being better than if there is an attempt to utilize for only short periods of delay a phantastron suitable for long time delays.

The pulse from the selected phantastron circuit is differentiated by the arrangement of condenser 638 and resistance 639 and is fed to the grid of a pulse forming circuit 640 which is similar to the circuit including the triodes 598 and 600, constituting a cathode-coupled bistable multivibrator for producing a positive pulse of very short duration, for example having a duration of the order of 1.5 microseconds. The output from this pulse forming arrangement is fed through line 642 at condenser 644 to the control grid of an amplifier tube 646 which may, for example, be of the beam power type. The amplified output from this tube is taken through pulse transformer 648 to the output terminal 650. It is to be noted that this pulse will be of the short time type just described and will be delayed after zero time by a delay produced by the operation of the phantastron circuit.

A second beam power amplifier tube 652 has its control grid connected to the control grid of tube 646. The anode of this tube is provided with a load resistor 654 and the output is delivered through line 656. By the arrangement of the tube a reversal of phase occurs so that a gating pulse corresponding to the pulse delivered at 650 but of negative sign is produced in the line 656.

Referring back to the cathode of triode 534 it will be evident that there is produced at this cathode a pulse similar to that appearing at its anode but negative. This pulse is differentiated by being fed through line 550 to the arrangement of condenser 658 and resistances 660 and the differentiated pulses are delivered to the grid of one tube of a pulse forming circuit 662 which is similar to 640 and the delay flip-flop including the triodes 598 and 600. As will be evident the negative pulse produced at a time minus 40 microseconds is ineffective since the left-hand triode is normally non-conducting. The positive pulse which appears at zero time, however, flips the flip-flop to its unstable state and accordingly there is produced from the circuit 662 through line 664 a positive peaked pulse which is differentiated by the arrangement of condenser 666 and resistance 667 and applied to the control grid of the beam power tube 668 which delivers its output through transformer 670 to the terminal 672. There is thus produced a very narrow positive pulse at zero time, the pulse width, for example, being of the order of 1.5 microseconds.

In résumé of the foregoing it may be pointed out that various outputs have been provided at the terminals 518, 528, 650 and 672 which are utilized for the control of other parts of the circuit as heretofore and hereafter described.

The pulse at predetermined delay time delivered through the line 656 is used for gating a voltmeter circuit which may be utilized for the measurement of instantaneous repeated values of various functions appearing in the apparatus. The gated voltmeter circuit which is shown in Figure 4B comprises the triodes 674, 676, 678 and 680. The triodes 678 and 680 are in a "constant current" follower arrangement with the input to this amplifier from the terminal 682 to the grid of triode 678. The terminal 682 may be selectively connected by suitable switching arrangements (not illustrated) to various points of other parts of the apparatus. A high impedance input is provided as is characteristic of cathode followers but the arrangement of the two triodes is particularly advantageous in providing for heavy current flow while at the same time the lower triode 680 provides a resistance in the cathode circuit of the upper triode. The output from this follower arrangement is delivered through connection 683 to the junction of triode 674 with the anode of triode 676. The negative gating pulse from the line 656 is delivered through condenser 684 to the grid of triode 674. The anode of triode 674 is connected through condenser 686 to the grid of triode 676. A condenser 688 of substantial size connects the cathode of triode 676 to ground while this cathode is connected to the grid of triode 680 through resistance 689. In the absence of a pulse at the grid of triode 674 this grid is at high positive potential compared with any value that the grid of triode 678 will attain and, therefore, triodes 674 and 680 form a double triode cathode follower with junction 683 near the grid potential of triode 674, thus maintaining triode 678 cut off. Triode 676 is also cut off because of the positive cathode bias. When the negative gating pulse is applied to the grid of triode 674 this tube is cut off and a positive pulse appears at its plate. Due to the cut off condition of tube 674 the potential at 683 falls rapidly, allowing tube 678 to conduct which, together with triode 680 acts as a cathode follower so that line 683 will become nearly equal to the potential existing at 682 at the time of the gating pulse at 656.

The purpose of triode 676 is to increase the rate of fall of the potential at 683 when the gating pulse is applied. Triode 676 is normally cut off but when the gating pulse is applied a corresponding positive pulse appears at the plate of triode 674. This pulse is differentiated by condenser 686 and the grid resistor of triode 676. Thus, during the time that the gating pulse at 656 is going negative, a positive spike is applied to the grid of triode 676 rendering it highly conductive to speed the discharge of the total capacitance at line 686. Condenser 688 provides a low cathode impedance during this interval. The connection of resistor 689 to the cathode of triode 676 will also raise the grid potential of triode 680 during this period making it more conductive and also assisting in attaining a rapid fall of potential at 683. During the flat portion of the gating pulse, triode 676 is returned to a non-conducting state so that triodes 678 and 680 are then acting as a constant current triode load cathode follower. The result is a negative pulse applied to the cathode of diode 692 corresponding to the instantaneous value of the input function at the instant of occurrence of the gating pulse. The condenser 694 quickly discharges from any previously assumed potential through the diode 692 and conducting triode 676 to ground so that in the repetition of cycles this condenser assumes a charge or potential equal to the input potential at terminal 682. This potential is applied to triode 696 in a cathode follower arrangement including the cathode resistor 698 and in turn this cathode potential is applied through diode 700 to condenser 702 which is also connected to the grid of triode 704 in a cathode follower circuit including the cathode resistor 705. The cathode of triode 704 delivers its output to meter 706 which, by reason of the operation just described takes on a steady current corresponding to the instantaneous value of the input function at the time of the gating pulse. Thus such a function may have its value measured at any desired instant of the operating cycle.

Figure 5:
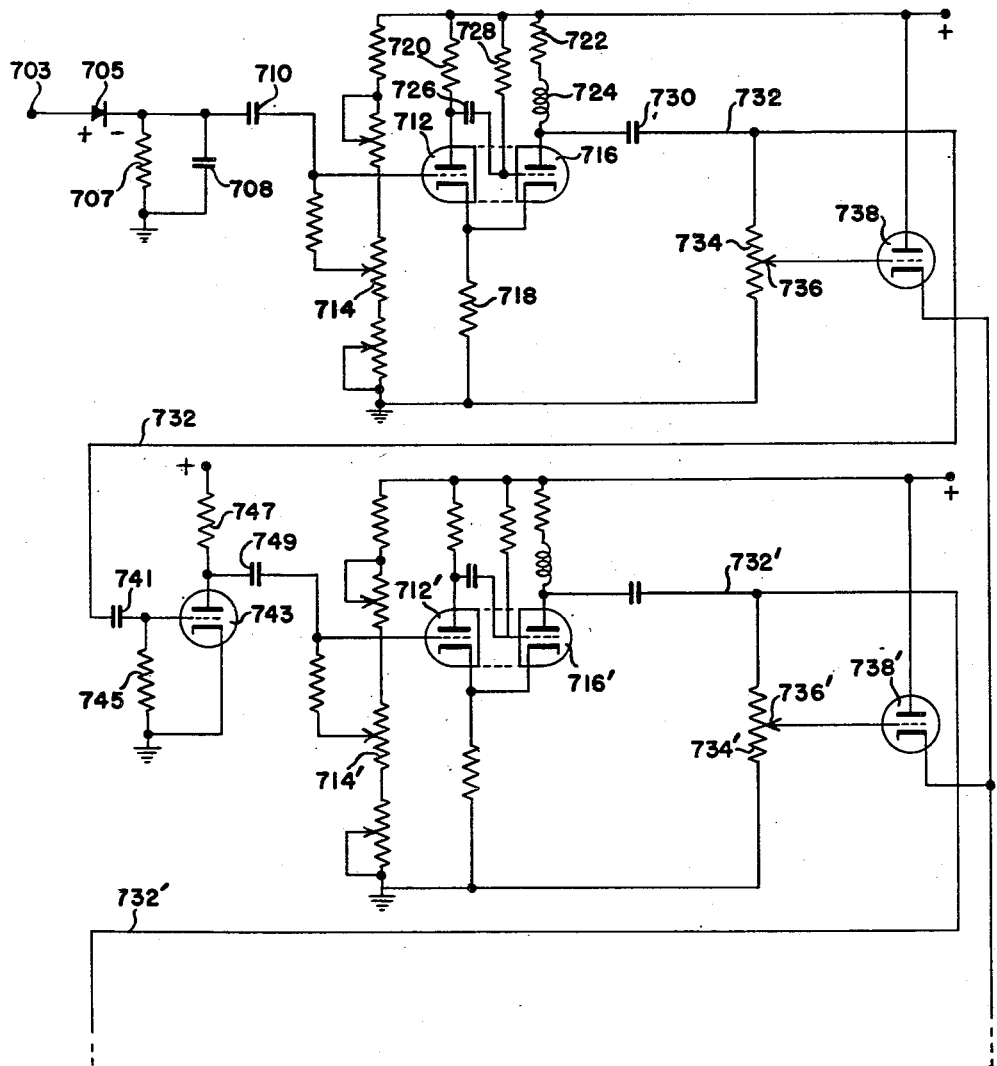
Figure 5 is a wiring diagram of a production function generator of the analyzer.

The nature of the production function generator will become apparent from Figure 5 which shows in detail only the first two of a large number of units arranged to provide a controllable step function. The input to this generator is a positive pulse at zero time applied at terminal 703 and passed by the crystal diode 705, the filter arrangement of resistance 707 and 708, and condenser 710 to the grid of a triode 712 which is associated with a second triode 716 in a conventional delayed flip-flop arrangement. The steady potential of the grid of triode 712 is controlled by adjustment of the contact of potentiometer 714 and this determines the delay interval of the flip-flop. The cathodes of triodes 712 and 716 are connected together and through the common cathode resistor 718 to ground. The anode of triode 712 is connected to the positive supply line through resistance 720 while the anode of triode 716 is connected to the same line through resistance 722 in series with a choke 724. The grid of triode 716 is also connected to the positive supply line through resistance 728, and through condenser 726 to the anode of triode 712. The output from the flip-flop is through the condenser 730 to the line 732 between which and ground there is connected the potentiometer resistance 734, the contact 736 of which is joined to the grid of a triode 738 having its anode connected to the positive supply line.

An extension of line 732 connects through condenser 741 to the grid of a phase-inverting triode 743, the anode of which is connected through resistance 747 to the positive supply line. The grid of triode 743 is connected to ground through resistance 745. The output from the anode of triode 743 is delivered through condenser 749 to the input of a flip-flop arrangement which is identical with that just described and comprises the triode 712' and 716'. As in the first stage the output is delivered through line 732' to the potentiometer 734', the contact 736' of which is joined to the grid of the output triode 738'. An extension of the line 732' connects similarly to a third stage, which is not shown, which is identical to the second stage just described, and this stage in turn is connected to a fourth, and so on, to give any desired number of steps required for the proper definition of the production function.

It will be noted that the cathodes of the tubes 738, 738', etc. are all connected to the common output line 740.

The operation of this production function generator is as follows:

A positive pulse entering at 703 trips the flip-flop from its condition involving normal conduction of triode 716 and cut-off of triode 712 to its unstable state involving conduction of triode 712 and cut-off of triode 716. After a time interval determined by the setting of the contact of potentiometer 714 the flip-flop reverts to its stable state. As will more fully appear hereafter in the description of the production control unit of Figure 6, the triode 738 is normally near cut off. At zero time a positive pulse emitted to the line 732 provides a positive pulse at the grid of triode 738 rendering it conductive. The overall magnitude of the positive potential applied to the grid of triode 738 is controlled by the position of potentiometer contact 736. Accordingly, the triode 738 will become conductive for an interval equal in duration to the period of maintenance of the flip-flop in its unstable state.

The positive pulse emitted at zero time on line 732 effects the production of a negative pulse through condenser 749 to be applied to the flip-flop of the second stage. This negative pulse is without effect since the triode 712' will be cut off. However, after the delay interval of the first stage when a negative pulse is emitted at the grid of triode 743 a positive pulse will be applied through condenser 749 to the second stage flip-flop and this in turn will be thrown into its unstable state to be returned to its stable state after an interval determined by the setting of the contact of potentiometer 714'. This second stage, in turn, emits a positive step on line 732' with the same controlling operation as just described.

It will, accordingly, be evident that the successive flip-flops are thrown to their unstable states successively, each attaining that state as the flip-flop of the preceding stage reverts to its stable state. As each of the flip-flops is in its unstable state its output triode is rendered conductive and to an extent determined by the setting of its individual potentiometer contact 736, 736', etc. It will be evident that while the triodes 738, 738', etc. are all connected in parallel to the output line 740, nevertheless only one of these triodes is at any time conducting and accordingly from the standpoint of the line 740 there is, in effect, at any time only a single triode connected thereto. It will be evident from the foregoing that the function generator produces a step function the durations of the steps of which are determined by the settings of the contacts of the potentiometers 714, 714', etc., while the amplitudes of the steps are determined by the settings of the potentiometer contacts 736, 736', etc. The number of stages involved depends upon the detail which is required in the production function through its complete duration.

Figure 6:
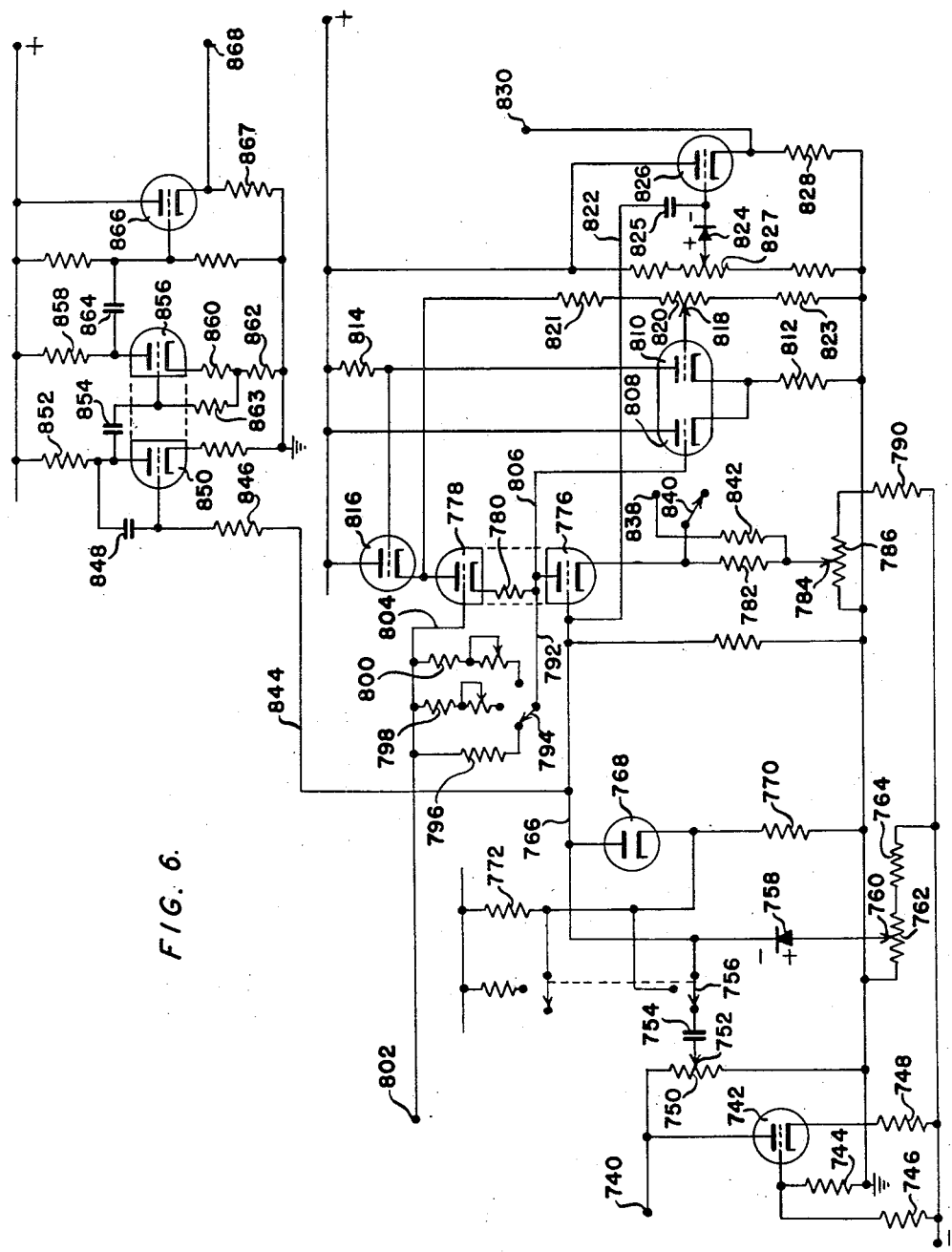
Figure 6 is a wiring diagram of the production control assembly of the analyzer.

Reference may now be made to Figure 6 showing the production control unit.

The purpose of this unit is to provide withdrawal of current from the water drive network in proportion to signals produced at the output of the production function generator. The line 740 from the function generator is connected to the anode of a triode 742, the grid of which is connected to ground through resistance 744 and to the negative high potential supply line through resistance 746, the cathode being connected to the latter through resistance 748. Triode 742 and its associated circuitry thus acts as the common cathode load for the cathode follower outputs from the function generator. The output is taken through the potentiometer 750 by its variable contact 752 and delivered through condenser 754 and switch 756 to the anode of a diode 768. This anode is connected through crystal diode 758 to the contact 760 of a potentiometer 762 which is arranged in series with a resistance 764 between ground and the negative potential supply line. The cathode of diode 768 is connected to the junction of resistors 770 and 772 arranged in series between ground and the positive potential supply line. The arrangement is such as to limit both positive and negative swings of signals in the line 766. This line is connected to the grid of a triode 776 which is in series with the triode 778, there being connected between the cathode of triode 778 and the anode of triode 776 a resistor 780 which is equal in value to a resistor 782 connected between the cathode of triode 776 and the contact 784 of a potentiometer 786 of low resistance value connected between ground and through resistance 790 to the negative potential supply line. The potentiometer contact 784 is merely provided for a zero adjustment and the resistance between the contact and ground may be neglected from the standpoint of consideration of operation.

The anode of triode 776 is connected at 792 to a switch 794 which may selectively engage the lower terminals of resistances 796, 798 and 800 which may have, for example, resistances of approximately one megohm, 100,000 ohms and 10,000 ohms, respectively, at last two resistances being adjustable. The upper terminals of these resistances are connected to terminal 802 of the water drive analog, which terminal appears in Figure 3. This terminal is connected at 804 to the grid of triode 778. The anode of triode 776 is connected at 806 to the grid of triode 808 associated with a second triode 810 in a differential amplifier arrangement, the cathodes of these triodes being connected to ground through resistance 812. The anode of triode 810 is connected to the positive supply line through resistance 814 and to the grid of a triode 816 connected between the positive potential supply line and the anode of triode 778. A grid of triode 810 is connected to the contact 818 of a relatively low resistance potentiometer connected between equal substantially higher resistances 821 and 823, the former of which is connected to the junction of the cathode of triode 816 and the anode of triode 778 while the latter is connected to ground.

The portion of the production control unit so far described operates as follows:

It will be noted that the triode 816 is in series with triode 778, resistance 780, triode 776 and resistance 782, neglecting the small resistance interposed to ground by the potentiometer 786. The setting of contact 818 connected to the grid of triode 810 controls through the triode 816 the ratio of potential existing between the anode of triode 778 and the anode of triode 776 to the potential existing between the anode of triode 776 and ground. Generally the ratio of these two potentials will be maintained approximately at unity by location of potentiometer contact 818 at the mid-point of potentiometer 820, the resistances 821 and 823 being equal. In operation the currents through resistances 780 and 782 are approximately equal, the current drawn from connection 802 which passes through resistance 782 being small in comparison with the current which flows in series through both resistances 780 and 782. The potential drops across resistances 780 and 782 are, accordingly, approximately equal since these resistances are equal, and as a consequence if the unity ratio referred to above is maintained it follows that the anode-cathode drops in the triodes 776 and 778 are approximately equal. The two triodes are accordingly operating under similar conditions which means, in turn, that the grid-cathode potentials of these two triodes are also approximately equal. These two triodes should be similar and preferably are constituted by the two triode elements of a twin triode having high transconductance. A result of this situation is that the potential existing between the grid of triode 778 and the point of connection between resistance 780 and the anode of triode 776 is very nearly equal to the potential existing between the grid of triode 776 and ground, and this relationship is practically independent of the characteristics of the two triodes 776 and 778 and of the potential existing between terminal 802 and ground. Since the potential drop across the selected one of resistances 796, 798 and 800 is thus made very nearly equal to the signal received from the production function generator it follows that the current withdrawal from terminal 802 is proportional to the signal from the generator, the ratio depending upon the value of the resistance just mentioned which is selected into the circuit. While the description has been made primarily on an assumption of location of the potentiometer contact 180 midway between the ends of the series of resistances 821, 820 and 823, it will be evident that fine adjustments, particularly made in the case of use of the lowest resistance 800 will maintain for the circuit substantial linearity and independence of the characteristics of tube 776 and 778, the zero adjustment by potentiometer contact 784 serving to help in this respect to secure very accurate zeroizing. When large currents are drawn, furthermore, there may be thrown into the circuit by engagement of switch 840 with contact 838 the resistance 842 in parallel with resistance 782. This corrects for the difference in currents flowing through the two triodes due to the heavy current withdrawal. It will be observed that the circuit arrangement just described is, in effect, an extremely precise subtracting circuit in which the output potential at line 806 is almost exactly the difference between the potential at 802 and the potential applied to the grid of triode 776, both with reference to ground.

The grid of triode 776 is connected through line 822 and condenser 825 with the grid of triode 826 arranged in a cathode follower arrangement with the resistance 828 connected to ground. The bias of the grid of triode 826 is maintained at proper value by connection through crystal diode 824 to the contact of a potentiometer 827 arranged between the positive voltage supply line and ground. The diode and condenser 825 act as a D. C. restorer so that the input waveform has its D. C. level restored so that the bottom of the waveform applied to the grid of triode 826 is at the potential determined by the setting of poteniometer 827. The cathode of triode 826 is connected to a terminal 830 which may be selectively connected to the terminal 682 of the gated voltmeter of Figure 4B. Since the amplitudes of the function generator step functions are to be measured by the gated voltmeter, it is necessary to raise the bottom level of the waveform to a value above the minimum level which the gated voltmeter can measure. This adjustment is accomplished by potentiometer 827.

It is at times desirable to observe the integral of the generator step function which appears at the line 766 and for this reason there is provided the integrating circuit at the upper right of Figure 6. A connection 844 joins the line 766 through resistance 846 to the grid of triode 850. This triode is provided with a load resistance 852 and there is connected between the grid and the anode of triode 850 a condenser 848. By reason of this arrangement integration is effected and the integral signal is delivered through condenser 854 to the grid of triode 856 provided with an anode resistor 858 and a cathode resistor arrangement comprising resistors 860 and 862 to the junction of which the grid of triode 856 is connected through resistance 863. The amplifying signal is delivered through condenser 864 to the grid of triode 866 in a cathode follower arrangement with resistance 867, the signal from the cathode being delivered to terminal 868 which may be selectively connected to the terminal 682 of the gated voltmeter shown in Figure 4B.

Figure 7:
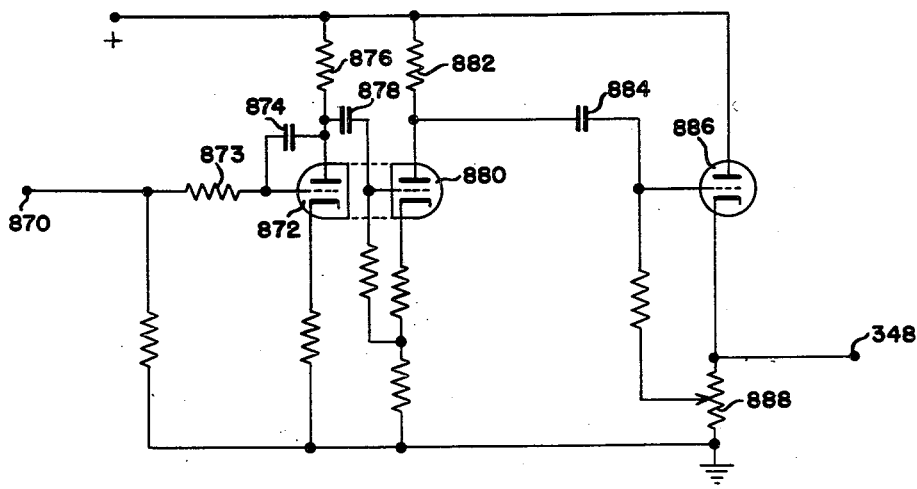
Figure 7 is a wiring diagram of the gas cap function integrator.

As has been mentioned heretofore the gas cap function generator indicated at F in Figure 1 may be similar to the production function generator illustrated in Figure 5. Generally there is required a smaller number of stages for this gas cap function generator. The gas cap function which is delivered to the gas cap analog, however, is more properly a ramp function rather than a step function and accordingly the gas cap function generator which produces a step function has its output integrated to provide a ramp function for delivery to the gas cap analog. For this purpose an arrangement such as illustrated in Figure 5 delivers its signals at what corresponds to the line 766 of Figure 6 to an integrator which is illustrated in Figure 7, the signals being delivered to the terminal 870 shown in this figure. The integrator is generally similar to that described in connection with Figure 6 and comprises a triode 872 to the grid of which the step signals are delivered through resistance 873. The grid of triode 872 is connected through condenser 874 to its anode which is connected to the positive potential supply line through load resistance 876. The result is integration of the step function to a ramp function which was delivered through condenser 878 to the grid of an amplifying triode 880 provided with a load resistance 882, the amplified integrated signals being then delivered through condenser 884 to the grid of a triode 886 arranged as a cathode follower in conjunction with the resistance 888. The signals are then delivered to terminal 348 of the gas cap analog.

References have been made heretofore to various circuit elements effecting subtraction, the flow of constant current irrespective of potential of its source, differentiation, integration, accurate timing, and addition. In connection with Figure 6 there have particularly been described arrangements whereby the first two functions just mentioned are accomplished. What is illustrated in Figure 6, however, is capable of very considerable generalization and there will now be described with reference to Figure 11 a unit which, by selective switching, may be provided to carry out the various functions just enumerated and which may be supplied for use at various portions of the analyzer herein described in place of other elements of quite different constructions. It will also become apparent that the circuit about to be described is of very general usefulness in many other applications.

If Figure 11 is compared with Figure 6, it will be found that there are many similar parts similarly connected and, in Figure 11, these parts are given the same numerals as in Figure 6 but are primed. In particular, the triodes 776′, 778′ and 816′ have their counterparts in Figure 6 as have also the triodes 808′ and 810′ which constitute a differential amplifier. In Figure 11, however, the circuit is generalized and provided with switches which may be adjusted so that it will perform various operations in addition to those of subtraction and constant current control. To this end there are provided ganged switches 900, 902 and 904 each of which has four possible positions indicated by the numbers associated with the contact points. The switch arm 904 is connected to the contact point of a switch 906 which is joined through a battery 908 to ground, the negative pole of the battery being grounded. The first contact of switch 902 is connected to a resistance 796′ which corresponds to 796 of Figure 6, this resistance being also connected to the line 792′ which extends to the junction of the anode of triode 776′ and the resistance 780′. The second contact point of switch 902 is connected to line 792′ through a condenser 910. The third contact of switch 902 is connected to the same line through a resistance 912. The first contact point of switch 900 is connected to an input line 802′ which corresponds to 802 of Figure 6. The second contact points of switches 900 and 904 are connected together through resistance 905. The third contact point of switch 904 is connected to the third contact point of switch 900 and through a condenser 914 to ground. A differential amplifier 916 which may be of the type constituted by triodes 808′ and 810′ or may be of other well-known type is provided with its output connected to the fourth contact point of switch 900. One of the inputs to this differential amplifier is from the line 792′. The other input is connected to a terminal 918 between which and ground there may be applied a potential $e_3$ which will be referred to hereafter. An input potential $e_2$ is applied to the terminal 766′ connected to the grid of triode 776′. In various uses of the apparatus a low impedance output may be taken from the terminal 920 connected to the cathode of triode 778′. A zero adjustment of the apparatus of Figure 11 is provided, differing from that illustrated in Figure 6, and comprising an adjustable resistance 922 which is connected along with a fixed resistance 924 between ground and the positive potential supply line.

The general functions of the differential amplifier comprising the triodes 808′ and 810′, and the triode 816′, in control of potential conditions in triodes 776′ and 778′ has already been described. The conditions may be summarized by stating that, for the various alternatives about to be described, if resistances 780′ and 782′ are equal and substantially less than other resistances such as 796′, 905 and 912 in the circuit, and if triodes 776′ and 778′ are matched as to characteristics, both triodes 776′ and 778′ will carry substantially the same current and will have the same anode to cathode voltage by virtue of the differential amplifier circuit which forces the anode of 778′ to a potential twice that of the anode of 776′ with respect to ground. The potential between the grid of triode 778′ and the anode of triode 776′ is equal to the potential between the grid of triode 776′ and ground. In view of this, the potential of line 792′ above ground is equal to the potential of the grid of triode 778′ less the potential of the grid of triode 776′. A high degree of linearity is achieved by virtue of a resulting cancellation of the curvature of the tube characteristics due to matching. It may be noted that curvature of the tube characteristics involve second order errors in any event because of the cathode follower arrangements. Further improvements are obtained in the way of matching transconductances and zero level between the triodes 776' and 778' by reason of the compensating adjustment at 818' and the zero adjustment at 922, the former compensating for transconductance differences and the latter for zero level difference. It may be further noted that exceptional frequency response is obtained because of a mutual cancellation of the effects of interelectrode tube capacities if triodes 776' and 778' are matched in this respect.

The primary objective of the circuit is the attainment of a voltage point (of line 792') which is $e_1 - e_2$ within the operating range of the tubes used.

With the switches 900, 902 and 904 on their first contact points, the circuit operates as a highly accurate subtracting circuit as has been described fully above. For arbitrary potentials applied to the grids of the triodes 776' and 778' an output corresponding to the difference of these potentials is obtained at the anode of triode 776'. A lower impedance point is available at the common cathode connection of the differential amplifier but with some error introduced by virtue of the grid to cathode transfer. As compared with various conventional subtracting circuits which have added to their outputs a direct potential, the present circuit has the advantage that such a direct potential is eliminated.

When the switch settings are as just described, furthermore, there is current withdrawn from the terminal 802' which is directly proportional to $e_2$ and independent of $e_1$. If the resistance 796' is much greater than the equal resistances 780' and 782', the current withdrawn is given very closely by $e_2$ divided by the value of the resistance 796'. However, even if 796' is not large in resistance value compared with resistances 780' and 782', proportionality is still very accurately obtained, though the ratio of proportionality is no longer the resistance value of 796'. It may be remarked that under these conditions and other conditions which provide a somewhat greater flow of current through triode 776' than through 778', the potential of line 792' is equal to the difference between the potential of the grid of triode 778' and a constant, other than unity, multiplied by the potential of the grid of triode 776'.

With the switches 900, 902 and 904 in their second positions and with switch 906 closed, the circuit acts as a differentiating circuit, there being provided at the grid of triode 778' a potential which is the negative of the first derivative of the potential of the grid of triode 776' with respect to time multiplied by a constant which involves the product of the resistance of resistor 905 and the capacity of condenser 910 and a constant which approaches unity if the resistance at 905 is large. The direct potential of battery 908, however, is added to the value of the derivative, but this direct potential is required to maintain the grid of triode 778' within its operating range. A low impedance output point is provided at terminal 920 which is connected to the cathode of triode 778'. A slight loss of gain is here involved as compared with the taking of the output from the grid of triode 778'.

The present differentiating circuit is extremely stable as compared with differentiating circuits heretofore proposed which, if they were to provide perfect differentiation, theoretically required infinite gain and had a strong tendency toward oscillation if the gain was sufficiently increased to give a good approach to perfect differentiation.

If the switches 900, 902 and 904 are set in their third contact positions, and if switch 906 is first closed to charge condenser 914 and then opened, the potential appearing at the grid of triode 778' will be negatively proportional to the integral with respect to time of whatever varying or constant potential may be applied at $e_2$, there being a constant term in this integration corresponding to the initial potential of charge of the condenser 914 by battery 908. The constant of proportionality is the reciprocal of the product of the resistance at 912 by the capacity of condenser 914, this reciprocal being multiplied by a constant which approaches unity as the value of resistance 912 becomes large. While a mechanical switch has been indicated at 906, it will be understood that if the circuit is to be used in a cyclically repetitive system, this charging switch may be replaced by an electronic charging arrangement such as that illustrated in, and described with reference to, Figure 3.

Terminal 920 may again be used to provide a low impedance output point with a slight reduction in gain.

The integrating arrangement just described may also be contrasted with those previously suggested which, for theoretically perfect integration, require infinite gain and are unstable if a good approximation to perfect integration is required. In contrast, the present circuit is completely stable.

With conditions as just outlined for securing integration there may be secured a highly linear sweep by providing at $e_2$ a direct potential. The sweep rate may be controlled by the value of this potential and, in particular, the circuit has application in an automatic sweep rate control circuit where a rate proportional to a potential $e_2$, existent in the circuit, is required. In view of the high degree of linearity in this circuit it is possible to obtain a highly linear sweep the rate of which is linearly controlled by the value of $e_2$. Here again, of course, the return sweep must be provided by an electronic circuit which will periodically restore the potential of condenser 914 to an initial value.

Since the basis of most timing circuits is the generation of a highly linear sweep with a regenerative pick-off or comparison circuit to establish the time of coincidence of the sweep potential with a potentiometrically controlled potential, it will be evident that an accurate timing circuit may be provided by utilizing the sweep arrangement just mentioned. The accuracy of most timing circuits is dependent upon the linearity and stability of the steep waveform and the stability of the pick-off circuit. By the present integrating arrangement with a direct potential applied at $e_2$ an accuracy may be obtained considerably superior to that afforded by phantastron and other linear sweep timers.

With switches 900, 902 and 904 in their fourth contact positions (in which switches 902 and 904 are actually inoperative) there is provided an addition circuit. The differential amplifier at 916 compares the difference of potentials $e_1$ and $e_2$ with the input potential $e_3$. It delivers an output $e_1$ in such phase as to force $e_1$ to minimize the difference between its other two inputs. If, therefore, the differential amplifier gain is sufficiently high, $e_3$ will be equal to the difference between $e_1$ and $e_2$, or, in other words, $e_1$ will be equal to the sum of $e_2$ and $e_3$ which may be arbitrarily introduced within the operating range of the circuit. Again the terminal 920 provides a low impedance output with a slight loss of gain.

The stability of the circuit is inherently quite good as can be seen from the fact that the differential amplifier circuit regulating the anode potential of triode 778' is equivalent to an internal plate supply voltage regulator. Thus, the circuit is relatively insensitive to plate supply fluctuations. Since both triodes 776' and 778' are affected about equally by heater voltage changes, the equivalence of the two triodes is not appreciably affected by heater voltage variations. Temperature effects are similarly balanced out since the two triodes as well as their cathode resistors suffer similar changes due to temperature and the equivalence of the two tube circuits is thereby maintained.

It will be evident from the foregoing that the circuit arrangement of Figure 11 is not only applicable to use in the presently described computer but is advantageous for far more general use in various computers or other circuits.

As a preliminary to the discussion of the operation of the analyzer reference may be made to Figure 9 which is a time diagram of various pulses and functions appearing in the apparatus. The complete cycle of operation has a duration of 4000 microseconds. What may be considered the active portion of a cycle is the half cycle extending from zero time to 2000 microseconds. Following this is the restoring half cycle during which the water drive network becomes charged up and all of the other parts of the apparatus relax to their initial conditions. Where reference is herein made to times it will be understood that any cycle may be then under consideration and with reference to that particular cycle the preceding cycle may be in part referred to by reference to negative times as, for example, to the time minus 40 microseconds when square waves originate at the terminals 518 and 528 in the time control unit.

At 672' in Figure 9 there is indicated the zero time pulse which occurs at the beginning of each complete cycle and is of short duration as, for example, of the order of 1.5 microseconds. At 650' there is similarly indicated the pulse emitted at terminal 650 (Figure 4A) the time of which is variable and involves some predetermined delay $t_d$ beyond zero time. This is also a narrow pulse having a width of the order of 1.5 microseconds.

At 528' there is indicated the rectangular wave which is emitted at the terminal 528 in Figure 4A. This wave rises at minus 40 microseconds and has a duration of 2000 microseconds, having a drop at 1960 microseconds. At 518' there is similarly indicated the wave emitted at terminal 518 which has a drop at minus 40 microseconds and a rise at 1960 microseconds.

As will be evident from what has already been described the square wave 518' is the switching wave for the charging of the water drive analog. It is desirable that this should terminate at a time substantially preceding zero time so that any transients in the system will die out before the beginning, at zero time, of the active portion of the cycle. It is for this reason that the wave 518' should fall at minus 40 microseconds. Similarly as already described but referred to in greater detail hereafter, the wave appearing at 528 controls switching in the gas cap analog and it is desirable that the switch control should be initiated prior to zero time, accounting for the desirability of having the rise of wave 528' at minus 40 microseconds.

Another timing pulse which is not illustrated in Figure 9 is that previously referred to as occurring at the time $t_c$ which controls switching in the gas cap analog. This time is subject to adjustment as previously described and represents the time at which switching transition occurs at the four-diode switches illustrated in Figure 2A.

At 776' in Figure 9 there is illustrated the wave form emitted by the production function generator at the position of the line 766 in Figure 6. As will be evident from the foregoing description this is a step function with the amplitudes and durations of the steps subject to arbitrary choice. Such a step function corresponds realistically to the oil and water production in an actual field, the production being generally set at some constant value which is retained for some period of shorter or longer duration. The active production cycle is between zero and 2000 microseconds and is so indicated in Figure 9. The function may, of course, carry on beyond 2000 microseconds but will have no effect thereafter. It must, of course, terminate substantially prior to zero time of the next cycle in order that the charging of the water drive network may be achieved to a steady state.

As has been mentioned the gas cap function generator is similar to the production function generator and, like it, produces a step function. However, the gas cap function which is desired to be inserted into the gas cap analog would normally be approximated by a ramp function and for this purpose the gas cap function integrator of Figure 7 is provided which by integration of a step function gives rise at its terminal 348 to a ramp function of the type indicated at 348' in Figure 9.

Consideration may now be given to the overall operation of the analyzer with particular reference to Figure 10. It will be observed that Figure 10 is rather similar to Figure 1 except that the time control unit is omitted while the gas cap analog has its component elements represented in block diagram. Figure 10 should be considered in combination with Figures 2A and 2B. In Figure 10 various blocks of the gas cap analog are designated by their general functions and contain references to the tubes which are at least primarily involved therein. In certain cases where clarification results from indicating connections to individual tubes these are separately indicated by numerals within circles. Connecting lines are, in general, designated by one or more numerals corresponding to the connections in Figures 2A and 2B, and in certain instances there are indicated in the connections the particular functions undergoing transmission at various times. As will appear hereafter the times which are of interest in connection with the gas cap analog are those of the active portion of the cycle preceding and following the time $t_c$. In the cases of the switches which actually comprise the four-diode combinations the diagram indicates the equivalent ordinary single pole, single throw switches with indication of the equivalent positions of such switches before and after the time $t_c$.

Reference may first be made to the loop involving the condenser 4 and extending from terminal 2 through the follower comprising triodes 12 and 14, the amplifier comprising triodes 50 and 56 and the adder and follower arrangement including the triodes 70, 78 and 90 back to the lower plate of the condenser 4. As was previously stated this involves the application to the upper plate of the condenser of the potential which will now be designated $E_p$, existing to the terminal 2, and to the lower plate of the condenser the sum of this potential $E_p$ and a potential $E_v$ heretofore referred to as arbitrary. It was shown that the arrangement was such that as the potential $E_v$ increases current would flow in a direction from the upper plate of the condenser to the terminal 2. Consider now that the potential $E_p$ represents pressure at the production zone while, as will be justified later, the potential $E_v$ represents the volume of gas in the gas cap. Current flow at the terminal 2 represents flow of oil or water into or from the water drive. An increase of volume of the gas cap can only occur if liquid flows from the cap so as to augment the quantity of liquid in the production zone. Conversely a decrease of volume of the gas in the gas cap can only occur by flow of liquid from the production zone into the gas cap. The electrical analog to this situation involves a flow of current from the upper plate of condenser 4 to the terminal 2 upon increase of the potential $E_v$, and vice versa. It will be evident that the loop just referred to provides this analogy and causes a flow of current toward or from the terminal 2 depending upon the variations in the potential $E_v$. Thus the contribution of the gas cap to the production picture is properly represented. It remains now to show that the pressure $E_p$ and the volume $E_v$ are properly related in accordance with the gas law.

Consideration may now be given to the remaining portion of the gas cap analog pictured in Figure 10.

As has been described above the multiplier has three inputs to the triodes 18, 20 and 22, respectively. The first of these to the triode 18 is the pressure potential $E_p$. (In this statement and others which follow there will be omitted reference to constant potentials and substantially constant factors which are actually involved and have been referred to in connection with the description of the electrical details of operation; consideration will be simplified by assuming that only quantities of interest are involved, with a recognition that actually constants and factors of the type mentioned are also present but are, in effect, cancelled out in the ultimate results by the nature of the circuit details of the apparatus.)

With respect to the input to triode 20 there will first be considered what occurs in the apparatus during the active part of the cycle prior to the time $t_c$.

As will be clear from Figure 10 and the earlier description of the circuit, prior to $t_c$ the function from the gas cap integrator will be applied through terminal 348 and follower 342 to the triode 20. The signal thus applied is indicated as $E_A$. During this same period a signal from the output of the differential amplifier terminating with the triode 210 is delivered through connection 220 and the four-diode switch, which is closed, to follower 322 and thence to triode 22 along line 36. The signal thus applied will be $2E_v$ as will now be shown. The setting of potentiometer contact 170 determines by the control action of the differential amplifier comprising triodes 156 and 158 the input through connection 150 from the gated voltmeter comprising the triodes 98 to 134. This gated voltmeter receives on connection 37 the output from the follower 322 and samples it at zero time due to the application of the pulse at zero time at terminal 108. Through the connection to the triode 178 of the main differential amplifier the output from the differential amplifier comprising triodes 156 and 158 controls the value of $E_v$ at zero time to achieve the equality of the inputs to the triodes 156 and 158. At zero time, therefore, the setting of potentiometer contact 170 determines the value of $E_v$. At subsequent times, however, the input to triode 178 remains as at zero time, representing a constant value. Accordingly, the differential amplifier performs its operation after zero time to maintain the input to the triode 182 constant and accomplishes this result by insuring such variation, by its output, of $E_v$ as will maintain the product constant. In brief, the operation is essentially this: At times prior to $t_c$ a definite function $E_A$ is applied to triode 20. $E_p$ applied to triode 18 is determined in part by the operation of the water drive analog under the control of the production control unit and in part by its relationship with $E_v$ through the operation of the gas cap analog in accordance with the principles heretofore mentioned by reason of flow of current to or from the condenser 4. The product put out by the multiplier is maintained constant. $E_v$ is then controlled by the differential amplifier to maintain this product constant in the light of variations of $E_A$ and the consistent variations of $E_p$. This constant value of the product is its value at zero time determined by the setting of potentiometer contact 170 which sets the value of $E_v$ at zero time in view of the sampling by the gated voltmeter. In short, the product $E_p \cdot E_A \cdot E_v$ accordingly remains constant in the period prior to $t_c$. Considering now that $E_p$ represents pressure and $E_v$ represents gas volume, it will be evident that if $E_A$ is given by $$\frac{1}{ZnT}$$

the product is equivalent to:

$$\frac{PV}{ZnT} = \text{constant}$$

The above is, of course, the gas law in which Z is approximately a constant, and would be a constant in the case of a perfect gas, actually being chosen in accordance with the pressure to provide an accurate gas law, $n$ represents the total mols of gas in the gas cap, and T represents the absolute temperature. Since in practical operation the temperature of the gas cap is nearly constant and the quantity Z is also approximately constant, it will be evident that the variations in $E_A$ are due largely to withdrawal of gas from the gas cap or introduction of gas into the gas cap to provide repressuring, these operations changing the value of $n$. Actually the values of Z and T may also be changed and are involved in the changes assigned to $E_A$. For example, the apparatus may be first run with an assumption of constant Z at constant T. Then from the determination of the resulting pressure representing by $E_p$ a correction may be applied to the function $E_A$ to take into account variations of Z which would result from pressure changes. Similarly if variations of T should be expected from the operation these may also be taken into account by modifying the form of $E_A$. In short, by lumping Z, $n$, and T in a single function practically useful results may be secured, involving successive runs of the apparatus, without necessitating the provision of separate function generators for each of these variables.

For many purposes the time $t_c$ could be delayed until or beyond the end of the active cycle so as not to enter the picture at all, the operation then represented being that of arbitrary production with arbitrary variation of $E_A$ to correspond to withdrawal or introduction of gas according to a program determined by the gas cap function generator and integrator.

In many instances, however, it is desired to know what handling of gas, primarily in the way of repressuring, is necessary to maintain the volume of the gas cap constant after a certain time which is here represented as $t_c$. Accordingly the present apparatus is arranged to change its mode of operation at the time $t_c$ to maintain $E_v$ constant at the value achieved at $t_c$ and then provide an indication as to how $E_A$ must vary to maintain this constant volume condition. Assuming, therefore, that $t_c$ occurs during the active portion of the cycle the following operations occur:

At $t_c$ the right-hand switch indicated in Figure 10 opens. The condenser 320 is then charged to a potential $E_{vc}$ which is used to indicate the value of $E_v$ which occurs at time $t_c$. The condenser 320 retains this charge through the remaining portion of the cycle so that the input to the triode 22 of the multiplier is constant.

At the same time $t_c$ the left-hand switch is closed and connects the output from the differential amplifier along line 220 to the follower 342 and thence to triode 20, there being an overriding of the input at terminal 348 from the gas cap function integrator. The action of the differential amplifiers remains as before, constraining the output product of the multiplier to the value of this product at zero time. Accordingly the output from the differential amplifier along line 220 is of a function designated $(E_A)_v$ which represents the value of $$\frac{1}{ZnT}$$

corresponding to constant volume. In short, the function which is thus produced shows how the gas in the gas cap should be handled consistent with a particular liquid production program to insure that the volume of the gas cap remains constant at the value $E_{vc}$ which it had at time $t_c$.

It may be noted that the operation of the apparatus after $t_c$ is actually more elaborate than it need be and primarily exists only because the apparatus is available because of conditions before $t_c$, and because it is convenient to have the variations of $$\frac{1}{ZnT}$$

directly indicated. The equivalent of the described operation after $t_c$ would involve only interrupting current flow from terminal 2 to the gas cap analog (which actually occurs in the described apparatus) with measurement of the potential of terminal 2 and calculation of $$\frac{1}{ZnT}$$

from this potential. In short, after $t_c$ the described gas cap analog functions only as a calculator without effect on the remaining active parts of the analyzer.

It will be noted that the gated voltmeter comprising the triodes 376 to 388 may be switched at contacts 368 and 366 to measure either volume changes of the gas in the gas cap prior to $t_c$ or the gas cap function at constant volume involved after time $t_c$.

The analyzer which is provided in accordance with the above is capable of being used in many fashions with extreme simplicity of adjustment and rapidity of obtaining results. It is, consequently, particularly applicable to analyses involving, in effect, trial and error.

The flexibility and rapidity of obtaining results and the ease of making adjustments are particularly useful in determining what is usually a quite unknown factor involved in an oil reservoir, namely the characteristics of the water drive. The past history of a reservoir is generally known in terms of production of oil, water and gas with, possibly, repressuring at various times together with measurements of pressure, all being known in the way of time variations. If this history is fairly complete and accurate over a sufficiently extended period it is possible to determine to a fair degree of accuracy the natures of both the water drive and the gas cap by the use of the present apparatus so as to make these factors available for predetermining what may occur in the future. The determination of the nature of the water drive and the gas cap involves a series of successive approximations. First, there may be assumed some water drive characteristics and these may be set up in the apparatus of Figure 3. Similarly the nature of the gas cap may be assumed and set up by proper choice of a condenser 4. With this set-up the production control unit is set to provide a production program in accordance with past history and the gas cap function generator and integrator are arranged to provide $E_A$ corresponding to the past history involving the handling of gas. The apparatus may then be operated and measurements made of variations of pressure with respect to time. In the first instance these will probably not agree with the results actually measured in the past. From a study of the results, however, there will become evident the probable mistakes made in the original assumptions with respect to the water drive and the gas cap. Corrections may then be made and the apparatus again cycled in correspondence with past history. It may then be found that the pressure changes correspond somewhat better with those measured but may still involve errors so that again corrections may be made. By sufficient repetitions of this procedure the pressure history of the reservoir may be reproduced in the apparatus to an accurate extent whereupon it may be assumed that, so far as inferences may be drawn from the past history, a correct assumption has been made for the water drive and gas cap of the reservoir. After conformity with past history has thus been obtained the apparatus may be operated to provide predictions as to what may or should occur in the future. Arbitrary production programs may be tried out in the apparatus to determine what effects they may produce on the reservoir. Repressuring by gas may be tentatively tried. As will be evident it is particularly desirable to know what should be done to maintain the volue of gas in the gas cap and this may be determined as heretofore described by operating the apparatus to correspond to constant gas volume after $t_c$.

Reference may be made particularly to the gated voltmeter illustrated in Figure 4B which is of quite universal applicability to various portions of the analyzer by connection thereof to the terminal 682. While desirably cathode ray oscillographs may be connected to various portions of the apparatus for the purpose of guiding rough adjustments, the use of this gated voltmeter makes it possible to set various parts of the apparatus so that potentials have desired values at any chosen instants during the active portion of the cycle. Thus the terminal 682 may be connected to various terminal points in the water drive network or to the production control unit to set the production control pattern, or to the gas cap function generator and integrator to determine accurately the function produced thereby.

Not only in accordance with the above is a high degree of accuracy provided, much superior to that secured by making measurements solely with oscillographs, but the fact that the time constants involved are low and consequently the repetition rate of the cycle is high measurements may be made in a minimum of time thus making possible the repeated trials of various set-ups such as would be prohibitive in the use of apparatus involving long time constants and the necessity for observing variations of meters.

It will be noted that the effect of dissolved gas in the oil zone has not been specifically taken into account. In a good water drive field this effect will generally be small. However, where the extent of the water drive is limited the dissolved gas may have an appreciable effect on the reservoir. Although not otherwise stated herein, it is apparent that from a knowledge of the compressibility of the oil and its dissolved gas and the estimated volume of initial oil, it is possible to determine a correction to the $$\frac{1}{ZnT}$$

function voltage $E_A$ which correction will, when transferred to its resulting effect on the voltage $E_v$, have the proper dynamic effect on the reservoir analog. Since the voltage $E_A$ may be arbitrarily generated it may include such additional variation as is necessary to approximate the effect of dissolved gas in the reservoir without the necessity of additional function generators.

The validity of representation of characteristics of an actual oil reservoir by the analog described depends upon the following assumptions:

1. That a sufficient number of water drive sections are used in the network of Figure 3.
2. That equipotential contours remain constant in space throughout the active period involved.
3. That for each zone of the reservoir the fractional porosity, the permeability, the viscosity and the liquid compression remain constant.
4. That the effect of gravity from the standpoint of substantial changes in head is negligible.
5. Darcy's law and the compressibility equation are valid.
6. The pressure at all points of the oil zone is the same.

All of these assumptions may be considered well justified from a practical standpoint, it being in fact substantially impossible to ascertain if there is deviation from the assumptions 2, 3 and 5. If there is reason to believe that deviations from the assumptions occur through a long period of time, the analysis for a complete period may be broken up into subanalyses for fractional periods with suitable changes in the constants of the apparatus from one subanalysis to the next.

Conversion factors must, of course, be established before an analysis is begun. Calling L the ratio of potentials in the electrical model in volts to pressure in the reservoir in pounds per square inch, Q the ratio of charge on an electrical condenser in micromicrocoulombs to volume in the reservoir in barrels, M the ratio of current in microamperes in the model to rate of volume flow in the reservoir in barrels per day, and T the time scale ratio of microseconds in the model to days in the reservoir, the resistance $R_n$ of a section in the electrical water drive network is given, in ohms, by:

$$R_n = 1.12 \frac{L}{M} \cdot \frac{\mu}{K} \cdot \frac{L_n}{S_n}$$

wherein $\mu$ is viscosity in centipoises, K is permeability in darcys, $L_n$ is average distance between contours of the corresponding reservoir zone in feet, and $S_n$ is the average cross-section of the corresponding reservoir zone in square feet.

The capacitance $C_n$, in microfarads, of a section in the electrical water drive network is given by:

$$C_n = 0.178 \frac{MT}{L} \cdot A_n \cdot d_n \cdot f \cdot C$$

wherein $A_n$ is the area of the corresponding reservoir zone in square feet, $d_n$ is the average sand thickness of the corresponding reservoir in feet, $f$ is fractional porosity (dimensionless) and $C$ is liquid compression in the reciprocal of pounds per square inch.

It will be evident that the conversion factors may be quite arbitrarily chosen as may be most convenient.

What is claimed is:

1. In combination, an electrical network, and means for producing repeatedly in each of a plurality of successive periods of time transient current flow in said network, said means including a device for controlling transient current flow at a terminal of said network, the device including a capacitance chargeable by the current flow at said terminal and providing current flow at said terminal such that the potential of said terminal and the potential across said capacitance are respectively related in accordance with the pressure and volume of a gas following the gas law.

2. In combination, an electrical network, and means for producing automatically repeatedly in each of a plurality of successive equal periods of time transient current flow in said network, said means including a device for controlling transient current flow at a terminal of said network such that the potential of said terminal and a current flow at said terminal are respectively related in accordance with the pressure and corresponding change of volume of a gas following the gas law.

3. In combination, an electrical network, and means for producing transient current flow in said network, said means including a device for controlling transient current flow at a terminal of said network such that the potential of said terminal and a current flow at said terminal are respectively related in accordance with the pressure and corresponding change of volume of a gas following the gas law.

4. In combination, an electrical network, and means for producing transient current flow in said network, said means including a programming means and a device controlled by said programming means for controlling transient current flow at a terminal of said network such that the potential of said terminal and a current flow at said terminal are respectively related in accordance with the pressure and corresponding change of volume of a gas following the gas law and subject to variation of pressure-volume product in accordance with said programming means.

5. In combination, an electrical network, and means for producing repeatedly in each of a plurality of successive periods of time transient current flow in said network, said means including a programming means operating repeatedly in said periods of time and a device controlled by said programming means for controlling transient current flow at a terminal of said network such that the potential of said terminal and a current flow at said terminal are respectively related in accordance with the pressure and corresponding change of volume of a gas following the gas law and subject to variation of pressure-volume product in accordance with said programming means.

6. In combination, an electrical network, and means for producing transient current flow in said network, said means including a programming means, a device controlled by said programming means for controlling transient current flow at a terminal of said network such that the potential of said terminal and a current flow at said terminal are respectively related in accordance with the pressure and corresponding change of volume of a gas following the gas law and subject to variation of pressure-volume product in accordance with said programming means, and means for interrupting the last mentioned current flow at said terminal to provide analogy to operation under constant gas volume conditions.

7. In combination, an electrical network, and means for producing repeatedly in each of a plurality of successive periods of time transient current flow in said network, said means including a programming means operating repeatedly in said periods of time, a device controlled by said programming means for controlling transient current flow at a terminal of said network such that the potential of said terminal and a current flow at said terminal are respectively related in accordance with the pressure and corresponding change of volume of a gas following the gas law and subject to variation of pressure-volume product in accordance with said programming means, and means for interrupting the last mentioned current flow at said terminal at corresponding times in each succeeding period of time to provide analogy to operation under constant gas volume conditions.

8. In combination, an electrical network, and means for producing transient current flow in said network, said means including a device for controlling transient current flow at a terminal of said network such that the potential of said terminal and a current flow at said terminal are respectively related in accordance with the pressure and corresponding change of volume of a gas following the gas law, and said means including a second device for controlling said transient current flow in said network in the vicinity of said terminal.

9. In combination, an electrical network, and means for producing transient current flow in said network, said means including a device for controlling transient current flow at a terminal of said network such that the potential of said terminal and a current flow at said terminal are respectively related in accordance with the pressure and corresponding change of volume of a gas following the gas law, and said means including a second device for controlling said transient current flow in said network in the vicinity of said terminal, said second device including programming means for predetermined variable control of current flow thereby.

10. In combination, an electrical network, and means for producing repeatedly in each of a plurality of successive periods of time transient current flow in said network, said means including a device for controlling transient current flow at a terminal of said network such that the potential of said terminal and a current flow at said terminal are respectively related in accordance with the pressure and corresponding change of volume of a gas following the gas law, and said means including a second device for controlling said transient current flow in said network in the vicinity of said terminal, said second device including programming means operating repeatedly in said periods of time for predetermined variable control of current flow thereby.

11. In combination, an electrical network, and means for producing transient current flow in said network, said means including a programming means and a device controlled by said programming means for controlling transient current flow at a terminal of said network such that the potential of said terminal and a current flow at said terminal are respectively related in accordance with the pressure and corresponding change of volume of a gas following the gas law and subject to variation of pressure-volume product in accordance with said programming means, and said means including a second device for controlling said transient current flow in said network in the vicinity of said terminal.

12. In combination, an electrical network, and means for producing transient current flow in said network, said means including a programming means and a device controlled by said programming means for controlling transient current flow at a terminal of said network such that the potential of said terminal and a current flow at said terminal are respectively related in accordance with the pressure and corresponding change of volume of a gas following the gas law and subject to variation of pressure-volume product in accordance with said programming means, and said means including a second device for controlling said transient current flow in said network in the vicinity of said terminal, said second device including programming means for predetermined variable control of current flow thereby.

13. In combination, an electrical network, and means for producing repeatedly in each of a plurality of successive periods of time transient current flow in said network, said means including a programming means operating repeatedly in said periods of time and a device controlled by said programming means for controlling transient current flow at a terminal of said network such that the potential of said terminal and a current flow at said terminal are respectively related in accordance with the pressure and corresponding change of volume of a gas following the gas law and subject to variation of pressure-volume product in accordance with said programming means, and said means including a second device for controlling said transient current flow in said network in the vicinity of said terminal, said second device including programming means operating repeatedly in said periods of time for predetermined variable control of current flow thereby.

14. In combination, an electrical network, and means for producing transient current flow in said network, said means including a device for controlling transient current flow at a terminal of said network, the device including a capacitance chargeable by current flow at said terminal, programming means for providing a predetermined variable potential, and means for maintaining substantially constant the product of the last named potential, the potential of said terminal and the potential across said capacitance.

15. In combination, an electrical network, and means for producing transient current flow in said network, said means including a device for controlling transient current flow at a terminal of said network, the device including a capacitance chargeable by current flow at said terminal, programming means for providing a predetermined variable potential, and means for maintaining substantially constant the product of the last named potential, the potential of said terminal and the potential across said capacitance, the last mentioned means effecting control of the last mentioned potential.

16. In combination, an electrical network, and means for producing transient current flow in said network, said means including a device for controlling transient current flow at a terminal of said network, the device including a capacitance chargeable by current flow at said terminal, programming means for providing a predetermined variable potential, and means for maintaining substantially constant the product of the last named potential, the potential of said terminal and the potential across said capacitance, and the first mentioned means including a second device for controlling said transient current flow at at least approximately said terminal of the network thereby additionally affecting said potential of said terminal.

17. In combination, an electrical network, and means for producing transient current flow in said network, said means including a device for controlling transient current flow at a terminal of said network, the device including a capacitance chargeable by current flow at said terminal, programming means for providing a predetermined variable potential, and means for maintaining substantially constant the product of the last named potential, the potential of said terminal and the potential across said capacitance, and the first mentioned means including a second device for controlling said transient current flow at at least approximately said terminal of the network thereby additionally affecting said potential of said terminal, said second device including programming means for predetermined variable control of current flow thereby.

18. In combination, an electrical network, and means for producing transient current flow in said network, said means including a device for controlling transient current flow at a terminal of said network, the device including a capacitance chargeable by current flow at said terminal, programming means for providing a predetermined variable potential, and means for maintaining substantially constant the product of the last named potential, the potential of said terminal and the potential across said capacitance, the last mentioned means effecting control of the last mentioned potential, and the first mentioned means including a second device for controlling said transient current flow at at least approximately said terminal of the network thereby additionally affecting said potential of said network.

19. In combination, an electrical network, and means for producing transient current flow in said network, said means including a device for controlling transient current flow at a terminal of said network, the device including a capacitance chargeable by current flow at said terminal, programming means for providing a predetermined variable potential, and means for maintaining substantially constant the product of the last named potential, the potential of said terminal and the potential across said capacitance, the last mentioned means effecting control of the last mentioned potential, and the first mentioned means including a second device for controlling said transient current flow in said network in the vicinity of said terminal thereby additionally affecting said potential of said network, said second including programming means for predetermined variable control of current flow thereby.

20. In combination, an electrical network, means for producing repeatedly in each of a plurality of successive periods of time transient current flow in said network, said means including a device for controlling transient current flow at a terminal of said network such that the potential of said terminal and a current flow at said terminal are respectively related in accordance with the pressure and corresponding change of volume of a gas following the gas law, means for producing at substantially the same phase in each of said periods a signal having a duration very short in comparison with the duration of said periods, and means controlled by said signals responsive to an electrical condition of said network at the time of occurrence of each of said signals.

21. In combination, a resistance-capacitance network including a plurality of capacitances, and means for simultaneously individually and independently charging said capacitances to predetermined potentials repeatedly in each of a plurality of successive periods of time.

22. In combination, a resistance-capacitance network including a plurality of capacitances, means for individually and independently charging said capacitances to predetermined potentials repeatedly in the initial portion of each of a plurality of successive periods of time, and programmed means for effecting simultaneous discharge of said capacitances during the latter portion of each of said plurality of successive periods of time.

23. In combination, a resistance-capacitance network including a plurality of capacitances, means for individually and independently charging said capacitances to predetermined potentials repeatedly in the initial portion of each of a plurality of successive periods of time, programmed means for effecting simultaneous discharge of said capacitances during the latter portion of each of said plurality of successive periods of time, means for producing at substantially the same phase in each of the latter portions of said periods a signal having a duration very short in comparison with the duration of said periods, and means controlled by said signals responsive to an electrical condition of said network at the time of occurrence of each of said signals.

24. In combination, a resistance-capacitance network including a plurality of capacitances, means for individually and independently charging said capacitances to predetermined potentials repeatedly in the initial portion of each of a plurality of successive periods of time, and programmed means for isolating said condensers from said charging means and effecting simultaneous discharge of said capacitances during the latter portion of each of said plurality of successive periods of time.

25. In combination, an electrical network, and means for producing transient current flow in said network, said means including a device connected to a terminal of said network, which terminal has a variable potential during said transient current flow, and means for programming a potential to have a predetermined variation during said transient current flow and for delivering such programmed potential to said device, said device being of a type providing a flow of current from said terminal substantially linearly proportional to said delivered potential irrespective of the potential of said terminal.

26. In combination, an electrical network, and means for producing transient current flow in said network, said means including a device connected to a terminal of said network, which terminal has a variable potential during said transient current flow, and means for programming a potential to have a predetermined variation during said transient current flow and for delivering such programmed potential to said device, said device including a resistor having one terminal connected to the first mentioned terminal and means for applying to the other terminal of said resistor a potential substantially constantly proportional to the difference between the potential of the first mentioned terminal and said delivered potential.

27. In combination, an electrical network, and means for producing transient current flow in said network, said means including a device connected to a terminal of said network, which terminal has a variable potential during said transient current flow, and means for programming a potential to have a predetermined variation during said transient current flow and for delivering such programmed potential to said device, said device including a resistor having one terminal connected to the first mentioned terminal and means for applying to the other terminal of said resistor a potential substantially constantly equal to the difference between the potential of the first mentioned terminal and said delivered potential.

28. In combination, an electrical network, and means for producing transient current flow in said network, said means including a device connected to a terminal of said network, which terminal has a variable potential during said transient current flow, and means for programming a potential to have a predetermined variation during said transient current flow and for delivering such programmed potential to said device, said device including a pair of similar thermionic vacuum tubes, each having an anode, a cathode, and a control grid, substantially equal resistances between the cathode of one tube and the anode of the other and between the cathode of the second tube and a common terminal constituting a datum of reference for the aforementioned potentials, the first mentioned terminal being connected to the control grid of the first mentioned tube and said programmed potential being delivered to the control grid of the second tube, means controlling series flow of current through said tubes to maintain the anode of the first tube at a potential with reference to said datum substantially constantly equal to twice the potential of the anode of the second tube with respect to said datum, and a resistor connecting the grid of the first tube to the anode of the second tube.

29. In combination, an electrical network, means for producing transient current flow in said network, said means including a device connected to a terminal of said network, which terminal has a variable potential during said transient current flow, and means for programming a potential to have a predetermined variation during said transient current flow and for delivering such programmed potential to said device, said device being of a type providing a flow of current from said terminal substantially linearly proportional to said delivered potential irrespective of the potential of said terminal, and means for integrating the value of said delivered potential over the period of said transient current flow.

References Cited in the file of this patent

UNITED STATES PATENTS

| | | |
|---|---|---|
| 2,227,906 | Kellogg | Jan. 7, 1941 |
| 2,423,754 | Bruce | July 8, 1947 |
| 2,442,351 | Fritschi | June 1, 1948 |
| 2,450,360 | Schoenfeld | Sept. 28, 1948 |
| 2,470,434 | Eckman | May 17, 1949 |
| 2,472,464 | Bruce | June 7, 1949 |
| 2,482,544 | Jacobsen | Sept. 20, 1949 |
| 2,484,352 | Miller et al. | Oct. 11, 1949 |
| 2,509,042 | McIlroy | May 23, 1950 |
| 2,519,778 | Mizen | Aug. 22, 1950 |
| 2,540,524 | Houghton | Feb. 6, 1951 |
| 2,543,819 | Williams | Mar. 6, 1951 |
| 2,545,507 | Williams | Mar. 20, 1951 |
| 2,549,776 | Cleeton | Apr. 24, 1951 |
| 2,569,646 | Wade et al. | Oct. 2, 1951 |